United States Patent
Harb

(10) Patent No.: US 10,601,686 B2
(45) Date of Patent: Mar. 24, 2020

(54) SYSTEMS AND METHODS FOR IMPROVING QUALITY OF SERVICE WHILE STREAMING CODE-AGNOSTIC CONTENT

(71) Applicant: Rovi Guides, Inc., San Carlos, CA (US)

(72) Inventor: Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 333 days.

(21) Appl. No.: 15/785,826

(22) Filed: Oct. 17, 2017

(65) Prior Publication Data
US 2019/0116101 A1    Apr. 18, 2019

(51) Int. Cl.
| | |
|---|---|
| H04L 12/26 | (2006.01) |
| H04L 29/06 | (2006.01) |
| H04N 21/475 | (2011.01) |
| H04N 21/234 | (2011.01) |
| H04N 21/258 | (2011.01) |
| G06F 16/435 | (2019.01) |
| H04N 21/2343 | (2011.01) |
| H04N 21/44 | (2011.01) |
| H04N 21/442 | (2011.01) |
| H04N 21/482 | (2011.01) |
| H04L 12/24 | (2006.01) |

(Continued)

(52) U.S. Cl.
CPC ............ *H04L 43/08* (2013.01); *G06F 16/437* (2019.01); *H04L 41/50* (2013.01); *H04L 41/509* (2013.01); *H04L 65/4084* (2013.01); *H04L 65/604* (2013.01); *H04L 65/80* (2013.01); *H04N 21/23418* (2013.01); *H04N 21/23439* (2013.01); *H04N 21/234363* (2013.01); *H04N 21/25891* (2013.01); *H04N 21/44004* (2013.01); *H04N 21/4424* (2013.01); *H04N 21/4756* (2013.01); *H04N 21/4821* (2013.01); *H04N 21/8456* (2013.01); *H04N 21/8543* (2013.01); *G06F 3/0482* (2013.01)

(58) Field of Classification Search
CPC . H04L 65/80; H04L 65/4076; H04L 43/0888; H04L 43/0894; H04L 65/4084; H04L 65/607; H04L 43/08; H04L 43/16; H04L 65/60; H04N 21/8456; H04N 21/2402; H04N 21/44004; H04N 21/44209; H04N 21/2187; H04N 21/23424; H04N 21/2401; H04N 21/2407; H04N 21/2665; H04N 21/4358; H04N 21/44; H04N 21/44029

See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |

(Continued)

OTHER PUBLICATIONS

PCT/US2018/039311 International Search Report and Written Opinions dated Nov. 13, 2018.

(Continued)

*Primary Examiner* — Hitesh Patel
(74) *Attorney, Agent, or Firm* — Haley Guiliano LLP

(57) ABSTRACT

Systems and methods are described for a media guidance application (e.g., implemented on a user device) that improves quality of service while streaming code-agnostic content by optimizing buffering based on bit rate.

16 Claims, 9 Drawing Sheets

(51) Int. Cl.
H04N 21/8543 (2011.01)
H04N 21/845 (2011.01)
G06F 3/0482 (2013.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2010/0153885 A1 | 6/2010 | Yates |
| 2013/0311670 A1 | 11/2013 | Tarbox et al. |
| 2014/0241415 A1 | 8/2014 | Su et al. |
| 2015/0281635 A1 | 10/2015 | Tang et al. |
| 2017/0223361 A1* | 8/2017 | Blomqvist ....... H04N 21/23406 |
| 2018/0014051 A1* | 1/2018 | Phillips ................... H04L 67/02 |
| 2018/0302455 A1* | 10/2018 | Bordoloi ............... H04L 65/607 |

OTHER PUBLICATIONS

PCT/US2018/039311 International Search Report and Written Opinions dated Feb. 5, 2019.

* cited by examiner

SYSTEMS AND METHODS FOR IMPROVING QUALITY OF SERVICE WHILE STREAMING CODE-AGNOSTIC CONTENT

BACKGROUND

The amount of media available to users in any given media delivery system can be substantial. However, conventional media systems lack efficient media retrieval methods that take user preferences and technical limitations (e.g., poor bandwidth conditions) into account. Users may be presented with content that they may deem inappropriate. For example, children may be exposed to content with nudity, gore, and explicit language. Even if this content will not be viewed by the user, conventional media systems may further use precious bandwidth to retrieve and generate, for display, the content anyway. Furthermore, conventional media systems may inefficiently buffer content that the user does intend to view, causing chopping, stalling, and poor resolution.

SUMMARY

Systems and methods are described to address shortcomings in the conventional media systems via novel techniques for improving quality of service while streaming code-agnostic content, and for improving quality of service while streaming code-agnostic content by editing manifest files. Unlike conventional media systems, these systems and methods may prioritize the buffering of segments, of a media asset, associated with higher bit rates (and therefore requiring better bandwidth conditions) before segments associated with lower bit rates. For example, the systems and methods may receive a manifest file that indicates individual threshold bit rates necessary for a user's experience to not be affected for each segment. As the segments associated with a higher bit rate require better bandwidth conditions, the media guidance application may prioritize buffering these segments before other segments in case bandwidth conditions worsen. Additionally, or alternatively, the media guidance application may remove segments that are not used (or will not be viewable) by the user from the manifest file. By removing these segments, bandwidth is not consumed in an effort to receive content that will not be viewed by the user anyway. For example, the media guidance application may consider a user's content rating preferences such as parental guidance locks to remove scenes that are inappropriate for the user from the manifest file. But rather than simply blocking the content, the media guidance application may not buffer the scenes at all, to satisfy bandwidth limitations.

The media guidance application may receive a user input requesting a media asset. In response to receiving the user input, the media guidance application may identify a remote server on which the media asset is stored. The media guidance application may request a manifest file of the media asset, wherein the manifest file lists a plurality of segments that constitute the media asset, and wherein the manifest file further indicates a threshold bit rate for each segment. The media guidance application may determine a first threshold bit rate for a first segment of the plurality of segments and a second threshold bit rate for a second segment of the plurality of segments, wherein the first segment occurs before the second segment during playback of the media asset on a local device. The media guidance application may determine to buffer, at the local device, the second segment before the first segment in response to determining that the second threshold bit rate is higher than the first threshold bit rate. The media guidance application may buffer, at the local device, the second segment before the first segment and generate for display, from the buffer, the first segment before the second segment during playback of the media asset on the local device.

In some aspects, the media guidance application may receive a user input requesting a media asset. For example, the user may request a video "Mission Impossible" that he/she wants to view. This command may be received by the media guidance application through a user input interface that displays selectable videos for viewing.

In response to receiving the user input, the media guidance application may identify a first remote server on which the media asset is stored. In this case, the remote server can be any device that provides a service, such as file retrieval, for a client, such as the user's local device. Furthermore, the remote server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely. The media guidance application first identifies servers that can communicate with the media guidance application (e.g., transfer files, send delivery messages etc.). The media guidance application then determines whether the media asset (e.g., "Mission Impossible") requested by the user is on the server. If the media asset is on the server, the media guidance application identifies the server as a source for the media asset.

The media guidance application may request a manifest file of the media asset, wherein the manifest file lists a plurality of segments that constitute the media asset, and wherein the manifest file further indicates a threshold bit rate for each segment. For example, the video requested by the user, "Mission Impossible," may be split into multiple segments (e.g., video clips) that collectively form the video. Since "Mission Impossible" is a movie, these segments may be divided by content such as plot points (e.g., first scene, second scene, etc.). Segments may also be divided equally based on time. For example, if the movie has a two-hour runtime, twenty segments can be generated, each being a non-overlapping six-minute clip. Furthermore, the remote server may arbitrarily divide the media asset into segments of different lengths and sizes (e.g., disregarding plot points). The manifest file indicates information about the plurality of segments such as the number of segments, size of each segment, length of each segment, and the threshold bit rate of each segment. The threshold bit rate for each segment is the number of bits per second that can be transmitted along a digital network, which are required to maintain a predetermined minimum quality of service, video resolution, etc. during playback of each respective segment. For example, in order to view "Mission Impossible" in high-definition (e.g., video resolution of 1280×720 px), each segment may have an associated bit rate to maintain the high-definition resolution throughout the entire movie. Accordingly, certain segments may be associated with higher threshold bit rates than other segments. For example, scenes with a variety of colors, frequent changes in color/brightness, or higher sound quality may have higher threshold bit rates since they contain more information that needs to be transmitted. Furthermore, depending on the segment, dropping the bit rate in a first segment (e.g., featuring a variety of colors) may be more noticeable to the viewer than dropping the bit rate in a second segment (e.g., feature few colors). Accordingly, the manifest file may indicate that the first segment has a higher threshold bit rate than the second segment.

In some embodiments, the predetermined minimum video resolution for each respective segment is determined by a content provider. For example, the production or distribution company associated with the movie "Mission Impossible" may set the minimum video resolution to 480p (i.e., 640× 480 px), corresponding to standard definition, for a segment that is generally dark, which results in the lower resolution being less perceptible by the viewer. In contrast, the production or distribution company may set the minimum video resolution to 1080p, corresponding to high definition, for a segment that is bright with a variety of colors, which results in a lower resolution being more perceptible by the viewer.

In some embodiments, the predetermined minimum video resolution for each respective segment is determined by a user preference. For example, the media guidance application may receive a user indication via the user profile a minimum video resolution (e.g., view content solely in high-definition) for all videos the user views. Alternatively, the media guidance application may receive a user indication that non-action scenes (e.g., opening credits, etc.) may be transmitted at a lower bit rate to ensure bandwidth conditions do not affect the display of the action scenes at a high bit rate.

In some embodiments, the predetermined minimum video resolution for each respective segment is determined by detecting a threshold number of different colors in each respective segment. For example, if scene A contains 180 colors in a two-minute segment and scene B contains 10 colors in a two-minute segment, scene A will have a different minimum video resolution than scene B. This is because scene A has considerably more colors. Accordingly, a lower video resolution for scene B would be more perceptible to the user.

In some embodiments, the predetermined minimum video resolution for each respective segment is determined by detecting a threshold number of colors changes for a single pixel location on consecutive frames in each respective segment. Suppose that segments are divided based on the content of the media asset (e.g., "Mission Impossible" is divided by plot points). For example, the climax of "Mission Impossible" may feature several action scenes in which the camera cuts between multiple locations and characters. In comparison, suppose that another scene in "Mission Impossible" features a monologue by a character in the movie. The scene may be a long close-up of the character. The amount of color changes per pixel in the former will be far greater than the latter. Based on this determination, the media guidance application (or manifest file) assigns the action scenes a higher threshold bit rate than the monologue scene as a lower resolution for the action scene would be more perceptible to the user.

In some embodiments, the predetermined minimum video resolution for each respective segment is determined by detecting a threshold frame rate in each respective segment. For example, if scene A has a frame rate of 24 frames per second (fps) and scene B has a frame rate of 60 fps, both scenes will have different bit rates even if they feature the same content. This is because scene B is transmitting more data in a given period of time. Therefore, at a given threshold bit rate, the minimum video resolution will be determined by the threshold frame rate. For example, the high frame rate may indicate that a lower bit rate will be more perceptible to the user.

The media guidance application may determine, from the manifest file, a first segment sequence for the plurality of segments, wherein the first segment sequence corresponds to a sequence in which each segment of the plurality of segments is displayed during playback of the media asset on a local device. For example, the manifest file may indicate the order of the scenes in which "Mission Impossible" must be played back to retain the original sequence of the movie.

The media guidance application may determine a first threshold bit rate for a first segment of the plurality of segments and a second threshold bit rate for a second segment of the plurality of segments, wherein the first segment occurs before the second segment in the first segment sequence. Suppose that the user wants to view "Mission Impossible" in high-definition resolution (e.g., 720p) and each scene has a 24-fps frame rate. The bit rate for the first segment, a monologue scene, may be 5 Mbps (i.e., megabits per second). The bit rate of the second segment, an action scene, may be 8 Mbps. Furthermore, the monologue scene may appear before the action scene in normal playback of the movie.

The media guidance application may compare the first threshold bit rate and the second threshold bit rate to determine whether the second threshold bit rate is higher than the first threshold bit rate. Continuing from the previous example, the media guidance application may determine that the second segment has a second threshold bit rate of 8 Mbps, which is higher than the first threshold bit rate of 5 Mbps.

The media guidance application may determine to buffer, at the local device, the second segment before the first segment in response to determining that the second threshold bit rate is higher than the first threshold bit rate. In the previous example, since the second segment has a greater bit rate, the media guidance application may determine that the second segment contains more information. Suppose that the second segment is 10 seconds long. If the threshold bit rate is 8 Mbps to run at 720p, the second segment has a size of 80 Mb. Likewise, if the first segment is 10 seconds long, the first segment size is 50 Mb when running at 720p. Furthermore, the user may be retrieving data from the server at a rate of 9 Mbps. In order to ensure that the second segment is fully buffered, the media guidance application may determine that the second segment should be buffered before the first segment. This ensures that even if the data retrieval rate from the server drops, the user can view both segments without any degradation in quality. Accordingly, the media guidance application may buffer, at the local device, the second segment before the first segment.

In some embodiments, determining to buffer, at the local device, the second segment before the first segment is further in response to determining that current bandwidth conditions support buffering an additional segment of the plurality of segments while the third segment of the plurality of segments is generated for display from the buffer without stalling playback of the third segment. For example, the media guidance application may first determine whether the current bandwidth conditions can support buffering an additional segment while a third segment is generated for display. If the data retrieval rate from the server needs to be at least 8 Mbps to successfully retrieve all segments and the user's data retrieval rate drops to 5 Mbps, the media guidance application may determine that the current bandwidth conditions cannot support buffering additional segments.

The media guidance application may generate for display, from the buffer, the first segment before the second segment during playback of the media asset on the local device.

According to the first segment sequence, the first segment should be played back before the second segment. Even though the second segment is buffered before the first segment, playback follows the first segment sequence.

In some embodiments, buffering, at the local device, the second segment before the first segment occurs while a third segment of the plurality of segments is generated for display from the buffer, and wherein the third segment occurs before both the first segment and the second segment in the first segment sequence. For example, a third segment that occurs before the first and second segment during playback may be generated for display while the media guidance application buffers the first and second segments.

In some embodiments, the media guidance application may request the manifest file from a second remote server. For example, data associated with the media asset may be distributed over multiple servers. The first server may hold the media asset's segments, while the second remote server may hold the media asset's manifest file and metadata.

In some embodiments, the media guidance application may determine, from the manifest file, a second segment sequence for the plurality of segments, wherein the second segment sequence corresponds to a sequence in which each segment of the plurality of segments is buffered on the local device in an order based on the threshold bit rate for each segment. For example, rather than locally determining an order by which to buffer segments, the media guidance application may refer to the manifest file for a predetermined sequence organized by threshold bit rates. If the second segment has a 10-Mbps threshold bit rate and the first segment has a 5-Mbps threshold bit rate, the second segment sequence may order the second segment before the first segment. In contrast, the second segment sequence may be organized such that lower bit rates are given more priority. Thus, the first segment may be buffered before the second segment.

In some embodiments, the media guidance application may determine a third threshold bit rate for a third segment of the plurality of segments, wherein the third segment occurs before the first segment in the first segment sequence. For example, the media guidance application may determine that the third segment's threshold bit rate is 4 Mbps. The media guidance application may compare the first threshold bit rate and the third threshold bitrate to determine whether the first threshold bit rate is higher than the third threshold bit rate. For example, the first segment's threshold bit rate may be 5 Mbps, which is greater than the third segment's threshold bit rate. The media guidance application may then determine to buffer, at the local device, the third segment before the first segment in response to determining that the third threshold bit rate is not higher than the first threshold bit rate. For example, the media guidance application may proceed to buffer the third segment, followed by the first segment. This may also be because the media guidance application may be following the second segment sequence described previously.

The media guidance application may receive a user input requesting a media asset. In response to receiving the user input, the media guidance application may identify a remote server on which the media asset is stored. The media guidance application may request a manifest file of the media asset, wherein the manifest file lists a plurality of segments that constitute the media asset, and wherein the manifest file further indicates a content rating for each segment. The media guidance application may determine a first content rating for a first segment of the plurality of segments. The media guidance application may compare the first content rating to a threshold content rating. The media guidance application may maintain the first segment on the manifest file in response to determining that the first content rating corresponds to the threshold content rating. The media guidance application may generate for display, the first segment during playback of the media asset on the local device.

In some aspects, the media guidance application may receive a user input requesting a media asset. For example, the user may request a video "Game of Thrones Episode 5" that he/she wants to view. This command may be received by the media guidance application through a user input interface that displays selectable videos for viewing.

In response to receiving the user input, the media guidance application may identify a first remote server on which the media asset is stored. In this case, the remote server can be any device that provides a service, such as file retrieval, for a client, such as the user's local device. Furthermore, the remote server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely. The media guidance application first identifies servers that can communicate with the media guidance application (e.g., transfer files, send delivery messages etc.). The media guidance application then determines whether the media asset (e.g., "Game of Thrones Episode 5") requested by the user is on the server. If the media asset is on the server, the media guidance application identifies the server as a source for the media asset.

The media guidance application may request a manifest file of the media asset, wherein the manifest file lists a plurality of segments that constitute the media asset, and wherein the manifest file further indicates a content rating for each segment. For example, the video requested by the user, "Game of Thrones Episode 5," may be split into multiple segments (e.g., video clips) that collectively form the video. Since "Game of Thrones Season 5" is a television show, these segments may be divided by content such as plot points (e.g., first scene, second scene, etc.). Segments may also be divided equally based on time. For example, if the movie has a two-hour runtime, twenty segments can be generated, each being a non-overlapping six-minute clip. Furthermore, the remote server may arbitrarily divide the media asset into segments of different lengths and sizes (e.g., disregarding plot points). The manifest file indicates information about the plurality of segments such as the number of segments, size of each segment, length of each segment, and the content rating of each segment. The content rating of each segment may indicate the recommended audience for which the content is suitable (e.g., TV-PG, TV-MA, PG-13, R, etc.). The exact value of the content rating may vary based on the origin of the content. For example, Brazil indicates a number that represents the minimum age the audience should be to view the content (e.g., 10, 12, 14, 18, etc.). In some embodiments, the content rating may be any arbitrary value or symbol that describes the content. For example, a segment featuring gore may have a content rating of "R" or "TV-MA," but it may also be the term "gore" or a symbol such as a red circle. The media guidance application may refer to stored content rating database that lists each representation (e.g., symbol, number, word, etc.) along with its respective meaning. Certain segments may therefore have a content rating of TV-PG because it features a normal conversation between characters, whereas another segment may have a content rating of a red circle because it features gore and violence.

In some embodiments, the media guidance application may determine, from the manifest file, a first segment sequence for the plurality of segments, wherein the first segment sequence corresponds to a sequence in which each segment of the plurality of segments is displayed during playback of the media asset on a local device, wherein requesting the manifest file is in response to receiving a user input requesting a media asset. For example, when the user requests the media asset, the media guidance application may request the manifest file. The manifest file may provide a first segment sequence which orders the segments based on the order they should be played back (e.g., to maintain the plot as originally intended by the content provider). If the user requests the media asset "Game of Thrones Episode 5," segment A may feature an argument between characters and segment B may feature a swordfight between the characters in response to the argument. Therefore, segment A should be played back before segment B.

The media guidance application may determine a first content rating for a first segment of the plurality of segments and a second content rating for a second segment of the plurality of segments. As discussed previously, content ratings may be arbitrarily set by the content provider or may be based on a country's regulation. Suppose the media asset originates from the United States. The content ratings for a television program will range from TV-Y (i.e., appropriate for all children) to TV-MA (i.e., specifically designed to be viewed by adults). Alternatively, the content provider may use symbols or words to determine a separate content ratings system. If the user requests to view "Game of Thrones Episode 5," the media guidance application may retrieve segments from the first remote server and determine the content rating for each segment. For example, the first segment may feature a scene with nudity and thus have a TV-MA content rating. The second segment may feature a scene of a normal conversation between characters and have a TV-PG content rating. Based on the manifest file, the media guidance application may determine these respective content ratings for the segments.

In some embodiments, the media guidance application may determine, from the manifest file, a first segment sequence for the plurality of segments, wherein the first segment sequence corresponds to a sequence in which each segment of the plurality of segments is displayed during playback of the media asset on a local device. Furthermore, determining the first content rating for the first segment of the plurality of segments and the second content rating for the second segment of the plurality of segments may be in response to determining that the media asset cannot be buffered for playback according to the first segment sequence, at current bandwidth conditions, without stalling or rebuffering. For example, current bandwidth conditions may indicate that the media asset cannot be buffered in its entirety without stalling or rebuffering. Therefore, the media guidance application may begin the process of editing manifest files to maintain the order of the first segment sequence (e.g., normal playback of the media asset) and satisfy current bandwidth conditions. The media guidance application may determine that removing segments that the user does not intend to view from the manifest file can satisfy the current bandwidth conditions. In response, the media guidance application may determine the content ratings of each segment.

The media guidance application may compare the first content rating to a threshold content rating. The threshold content rating represents a maximum content rating that the user can view. For example, the threshold content rating may represent a parental lock that prevents children from viewing content rated above TV-PG. If content ratings are symbols that represent elements such as gore, nudity, or violence (e.g., red circle, brown circle, red triangle, respectively), the threshold content rating may serve as a filter. Therefore, any segments associated with a content rating of a red circle or red triangle may blocked by a threshold content rating that filters out gore and violence. Based on the previous example, the media guidance application may determine that the first content rating is TV-MA. If the threshold content rating is TV-PG, the media guidance application may determine that the first content rating exceeds the threshold content rating.

The media guidance application may compare the second content rating to a threshold content rating. For example, the media guidance application may determine that the second content rating is TV-PG and the threshold content rating is also TV-PG. Therefore, the second content rating corresponds to the threshold content rating. In some embodiments, the threshold content rating is determined by a user preference. For example, a parental guidance lock retrieved from a user profile may indicate that content ratings above TV-PG are not allowable for viewing. The parental guidance lock provides the threshold content rating of TV-PG. In some embodiments, the threshold content rating is determined by a content provider. For example, the content provider may use symbols to rate segments with explicit language. The content provider may provide a child-friendly version of the content by providing a threshold content rating that can filter out segments with explicit language.

The media guidance application may remove the first segment from the manifest file in response to determining that the first content rating does not correspond to the threshold content rating. For example, upon determining that the first content rating of TV-MA exceeds the threshold content rating of TV-PG, the media guidance application may remove the first segment from the manifest file. Therefore, during buffering, the first segment may not be buffered.

The media guidance application may maintain the second segment on the manifest file in response to determining that the second content rating corresponds to the threshold content rating. For example, the media guidance application may determine that the second content rating of TV-PG corresponds to the threshold content rating of TV-PG. Therefore, the second segment may be left on the manifest file.

The media guidance application may buffer, at the local device, the second segment in response to determining that the second segment is listed on the manifest file. For example, the media guidance application may buffer, to the user's smartphone, the scene in "Game of Thrones Episode 5," which features a normal conversation between characters.

The media guidance application may generate for display, from the buffer, the second segment during playback of the media asset on the local device. For example, the media guidance application may display the scene featuring a normal conversation between characters, on the user's smartphone, for viewing.

In some embodiments, the media guidance application may buffer the second segment, at the local device, while a third segment of the plurality of segments is generated for display from the buffer. For example, while the media guidance application buffers the scene of a normal conversation between characters, the media guidance application may display the prior scene (e.g., the characters entering the room). Thus, the user is not simply waiting for all segments to buffer. Buffering and generating occur in parallel.

In some embodiments, buffering, at the local device, the second segment is in response to determining that current bandwidth conditions support buffering an additional segment of the plurality of segments while a third segment of the plurality of segments is generated for display from the buffer without stalling playback of the third segment. For example, if the media guidance application may determine that the current bandwidth conditions allow for the third segment to be generated for display and for an additional segment to be buffered at the local device. If these tasks cannot be performed in parallel due to the current bandwidth conditions, the media guidance application may not buffer additional segments until the current bandwidth conditions change.

In some embodiments, the media guidance application may determine, from the manifest file, a second segment sequence for the plurality of segments, wherein the second segment sequence corresponds to a sequence in which each segment of the plurality of segments is buffered on the local device in an order based on the content rating for each segment. For example, the media asset may be split into five segments on the remote server. Three of the segments may be associated with a content rating of TV-PG, whereas two segments may be associated with a content rating of TV-MA. The second segment sequence may order the three segments associated with a content rating of TV-PG before the two segments associated with a content rating of TV-MA. If the threshold content rating is TV-PG, the second segment sequence conveniently allows the media guidance application to remove the last two segments from the manifest file without individually comparing the respective content ratings with the threshold content rating.

In some embodiments, the second segment sequence corresponds to the first segment sequence after the first segment is removed. For example, if the media guidance application removed the first segment from the manifest file because the first content rating did not correspond to the threshold content rating, the first segment sequence may be referred to as the second segment sequence (e.g., modified version of the first segment sequence).

In some embodiments, the media guidance application may request the manifest file from a second remote server. For example, data associated with the media asset may be distributed over multiple servers. The first server may hold the media asset's segments, while the second remote server may hold the media asset's manifest file and metadata.

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
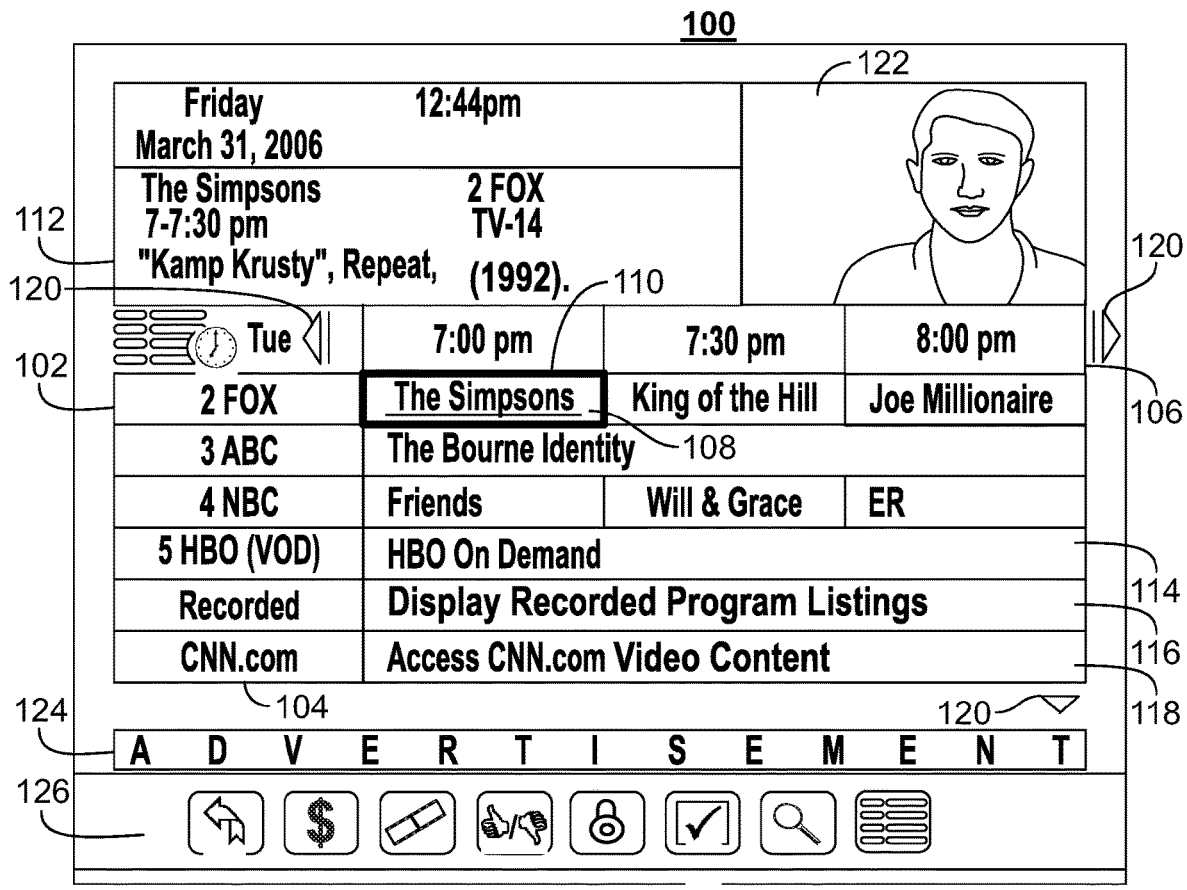
FIGS. 1 and 2 show illustrative examples of display screens generated by a media guidance application in accordance with some embodiments of the disclosure.

Systems and methods are described to address shortcomings in the conventional media systems via novel techniques for improving quality of service while streaming code-agnostic content. Unlike conventional media systems, these systems and methods may prioritize buffering segments of a media asset based on user preference and technical limitations (e.g., threshold bit rates, content rating, etc.).

Consider a scenario in which a user wants to view a media asset on their local device (e.g., smartphone). The media asset may be an episode of the user's favorite television show "Grey's Anatomy," a show that focuses on the lives of medical staff of a hospital in the United States. The media asset may be accessible from a remote server. Based on a user profile stored in the user's smartphone, the user preferences may indicate that any video viewed by the user must have a minimum resolution of 720p. The user may rely on the media guidance application for efficient retrieval and display of "Grey's Anatomy."

The amount of media available to users in any given media delivery system can be substantial. Consequently, many users desire a form of media guidance, an interface that allows users to efficiently navigate media selections and easily identify media that they may desire. An application which provides such guidance is referred to herein as an interactive media guidance application or, sometimes, a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate television programming viewing choices and, in some systems, digital music choices. The television programming (and music programming) may be provided via traditional broadcast, cable, satellite, Internet, or any other means. The programming may be provided on a subscription basis (sometimes referred to as premium programming), as pay-per-view programs, or on-demand such as in video-on-demand (VOD) systems.

With the advent of the Internet, mobile computing, and high-speed wireless networks, users are able to access media on personal computers (PCs) and devices on which they traditionally could not. Non-television-centric platforms (i.e., platforms that distribute media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs) or cellular telephones. In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is discussed in greater detail in U.S. patent application Ser. No. 11/246,392, filed Oct. 7, 2005, which is hereby incorporated by reference herein in its entirety.

The media guidance application may receive a user input requesting a media asset. For example, the user may request a video "Grey's Anatomy Episode 1" that he/she wants to view. This command may be received by the media guidance application through a user input interface that displays selectable videos for viewing. For example, the user may select the media asset from a variety of media assets displayed on his/her smartphone screen.

In response to receiving the user input, the media guidance application may identify a first remote server on which the media asset is stored. In this case, the remote server can be any device that provides a service, such as file retrieval, for a client, such as the user's smartphone. Furthermore, the remote server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely.

The media guidance application may first identify servers that can communicate with the media guidance application (e.g., transfer files, send delivery messages etc.). The media guidance application then may determine whether the media asset (e.g., "Grey's Anatomy Episode 1") requested by the user is on the server. The user's smartphone may send a broadcast media asset search query to multiple remote servers. The remote servers may each respond with acknowledgment messages, indicating that the search query has been received. The remote servers may begin a search for "Grey's Anatomy Episode 1" in their respective media asset databases. Upon determining that "Grey's Anatomy Episode 1" is available in the media asset database(s), the remote servers may transmit a message to the user's smartphone indicating availability of the requested media asset. The user's smartphone may then establish communication with one of the remote servers (e.g., remote server with the fastest response, remote server with the highest download/upload rates, nearest remote server, etc.).

The media guidance application may request a manifest file of the media asset, wherein the manifest file lists a plurality of segments that constitute the media asset, and wherein the manifest file further indicates a threshold bit rate for each segment. For example, the video requested by the user, "Grey's Anatomy Episode 1," may be split into multiple segments (e.g., video clips) that collectively form the video. These segments may be divided by content such as plot points (e.g., first scene, second scene, etc.), locations (e.g., bedroom scene, park scene, terrace scene, etc.) or characters (e.g., first character's monologue, second character's arrival, etc.). Segments may also be divided equally based on time. For example, if the show has a one-hour runtime, twenty segments can be generated, each being a non-overlapping three-minute clip. Furthermore, the remote server may arbitrarily divide the media asset into segments of different lengths and sizes (e.g., disregarding plot points).

The manifest file indicates information about the plurality of segments such as the number of segments as well as size, length, threshold bit rate, and content rating of each segment. The threshold bit rate for each segment is the number of bits per second that can be transmitted along a digital network, which are required to maintain a predetermined minimum video resolution during playback of each respective segment. For example, in order to view "Grey's Anatomy Episode 1" in high-definition (e.g., video resolution of 1280×720 px), each segment may have an associated bit rate to maintain the high-definition resolution throughout the entire video. Accordingly, certain segments may be associated with higher threshold bit rates than other segments. For example, scenes with a variety of colors or higher sound quality may have higher threshold bit rates since they contain more information that needs to be transmitted. Furthermore, depending on the segment, dropping the bit rate in a first segment (e.g., featuring a variety of colors) may be more noticeable to the viewer than dropping the bit rate in a second segment (e.g., feature few colors). Accordingly, the manifest file may indicate that the first segment has a higher threshold bit rate than the second segment.

In some embodiments, the predetermined minimum video resolution for each respective segment is determined by a content provider. For example, the production or distribution company associated with the "Grey's Anatomy Episode 1" may set the minimum video resolution to 480p (i.e., 640×480 px), corresponding to standard definition, for a segment that is generally dark, which results in the lower resolution being less perceptible by the viewer. In contrast, the production or distribution company may set the minimum video resolution to 1080p, corresponding to high definition, for a segment that is bright with a variety of colors, which results in a lower resolution being more perceptible by the viewer.

In some embodiments, the predetermined minimum video resolution for each respective segment is determined by a user preference. For example, the user may indicate, on his/her user profile, a minimum video resolution (e.g., view content solely in high-definition) for all videos the user views. In this example, the user preferences indicate that the user's minimum video resolution is 720p. The content provider's minimum video resolution is set to 480p. In this case, the media guidance application may choose the higher video resolution as the minimum video resolution to use when displaying "Grey's Anatomy Episode 1." If the content provider and the user do not indicate a minimum video resolution, the media guidance application may also refer to a default minimum resolution that can satisfy current bandwidth conditions. Alternatively, the media guidance application may receive a user indication that non-action scenes (e.g., opening credits, etc.) may be transmitted at a lower bit rate to ensure bandwidth conditions do not affect the display of the action scenes at a high bit rate.

In some embodiments, the predetermined minimum video resolution for each respective segment is determined by detecting a threshold number of different colors in each respective segment. For example, if scene A contains 180 colors in a three-minute segment and scene B contains 10 colors in a three-minute segment, scene A will have a different minimum video resolution than scene B. This is because scene A has more colors.

In some embodiments, the predetermined minimum video resolution for each respective segment is determined by detecting a threshold number of colors changes for a single pixel location on consecutive frames in each respective segment. Suppose that segments are divided based on the content of the media asset (e.g., "Grey's Anatomy Episode 1" is divided by plot points). For example, the episode may feature a tense surgery scene in which the camera cuts between multiple characters. In comparison, suppose that another scene in "Grey's Anatomy Episode 1" features a monologue by a character. The scene may be a long close-up of the character. The amount of color changes per pixel in the former will be far greater than the latter. The former would therefore require a lot more data to be transmitted in a given period of time in order to maintain the minimum video resolution (e.g., higher bit rate). This is because a pixel that maintains the same color in a given period of time may be represented in compact manner. Suppose that information transmitted about pixel settings is organized by pixel name, x-coordinate, y-coordinate, RGB color, and duration of depiction in seconds (e.g., [pixel 1, 1, 1, 0-255-0, 12]). For a twelve second segment, the information in the example highlighted may be enough for pixel 1. However, if pixel 1's color changes multiple times, additional information would be needed (e.g., [pixel 1, 1, 1, 0-255-0, 4], [pixel 1, 1, 1, 255-255-2, 3], etc.).

In some embodiments, the predetermined minimum video resolution for each respective segment is determined by detecting a threshold frame rate in each respective segment. For example, if scene A has a frame rate of 30 frames per second (fps) and scene B has a frame rate of 60 fps, both scenes will have different bit rates even if they feature the same content. This is because scene B is transmitting twice as many frames in a given period of time than scene A. Since each frame has additional information associated with it, scene B may have a higher threshold bit rate. If the user's local device is retrieving the media asset's segments at 10 Mbps, the media guidance application may determine that the minimum video resolution of scene B needs to be lower than scene A's minimum video resolution because scene B has more frames that need to be retrieved.

In each of these cases, the minimum video resolution may represent a resolution at which the user can view the content at an acceptable quality. For example, an action scene may have a higher minimum video resolution than a monologue scene because action scenes usually have more intricate features (e.g., smaller objects, several colors, color changes, high frame refresh-rates, etc.) In contrast, monologue scenes can be viewed at lower video resolutions without a noticeable drop, if any, in the quality of service. The media guidance application may therefore give priority to buffering an action scene before a monologue scene because the action scene may require a higher minimum video resolution and may have a higher bit rate. In order to improve the quality of service compared to conventional media systems, the media guidance application may be able to load all segments at their respective minimum video resolutions, even in poor bandwidth conditions.

The media guidance application may determine, from the manifest file, a first segment sequence for the plurality of segments, wherein the first segment sequence corresponds to a sequence in which each segment of the plurality of segments is displayed during playback of the media asset on a local device. For example, the manifest file may indicate the order of the scenes in which "Grey's Anatomy Episode 1" must be played back chronologically based on the scenes and plot of the episode.

It is important to note that the media guidance application may also retrieve files associated with the media asset from multiple servers. In some embodiments, the media guidance application may request the manifest file from a second remote server. For example, data associated with the media asset may be distributed over multiple servers. The first server may hold the media asset's segments, while the second server may hold the media asset's manifest file and metadata.

The media guidance application may determine a first threshold bit rate for a first segment of the plurality of segments and a second threshold bit rate for a second segment of the plurality of segments, wherein the first segment occurs before the second segment in the first segment sequence. Suppose that the user wants to view "Grey's Anatomy Episode 1" in high-definition resolution (e.g., 720p) and each scene has a 30-fps frame rate. The bit rate for the first segment, a monologue scene, may be 5 Mbps (i.e., megabits per second). The bit rate of the second segment, a tense surgery scene, may be 8 Mbps. Furthermore, the monologue scene may appear before the surgery scene in normal playback of the movie (e.g., based on the plot).

The media guidance application may compare the first threshold bit rate and the second threshold bit rate to determine whether the second threshold bit rate is higher than the first threshold bit rate. Continuing from the previous example, the media guidance application may determine that the second segment has a second threshold bit rate of 8 Mbps, which is higher than the first threshold bit rate of 5 Mbps.

The media guidance application may determine to buffer, at the local device, the second segment before the first segment in response to determining that the second threshold bit rate is higher than the first threshold bit rate. In some embodiments, the media guidance application may partially buffer the second segment before the first segment and then begin buffering the first segment, followed by the remainder of the second segment. In the previous example, since the second segment has a greater bit rate, the media guidance application may determine that the second segment contains more information. Suppose that the second segment is 4 seconds long. If the second threshold bit rate is 8 Mbps to run at 720p, the second segment has a size of 32 Mb. Likewise, if the first segment is 10 seconds long, the first segment size is 50 Mb when running at 720p. Furthermore, the user may be retrieving data from the server at a rate of 16 Mbps.

In order to ensure that the second segment is fully buffered, the media guidance application may determine that the second segment should be buffered before the first segment. This ensures that even if the data retrieval rate from the server drops, the user can view both segments without any degradation in quality. For example, the media guidance application may buffer the second segment in two seconds when the data retrieval rate is 16 Mbps and the size of the second segment is 32 Mb. Suppose that the data retrieval rate then drops to 5 Mbps. the media guidance application may buffer the first segment normally. It should be noted, however, that the new data retrieval rate of 5 Mbps is lower than the second threshold bit rate of 8 Mbps. Therefore, if the media guidance application did not buffer the second segment before the first segment, the media asset playback of the second segment would suffer from stalling and quality degradation (e.g., pixilation, blurriness, lower resolution, etc.). This is because the media guidance application cannot buffer 8 Mb every second. Accordingly, the media guidance application buffers, at the local device, the second segment before the first segment in order to maintain the quality of service. Furthermore, if the data retrieval rate drops to 1 Mbps, the media guidance application may be unable to buffer the first segment at a high definition resolution. Therefore, the media guidance application may retrieve the minimum video resolution of the first segment from the manifest file. The minimum video resolution of the first segment may be a standard definition resolution which requires a first threshold bit rate of 1 Mbps. Therefore, the media guidance application may be able to buffer the first segment at the minimum video resolution under current bandwidth conditions. Since the first segment is simply a monologue of a character, viewing the scene at a lower resolution may not be noticeable to the user. Thus, the media guidance application improves the quality of service from a situation where both segments are either buffered at very low resolutions, or not buffered at all.

The media guidance application may generate for display, from the buffer, the first segment before the second segment during playback of the media asset on the local device. According to the first segment sequence, the first segment should be played back before the second segment. Even though the second segment is buffered before the first segment, playback follows the first segment sequence in order to maintain the chronological order by which the content is meant to be viewed.

In some embodiments, buffering, at the local device, the second segment before the first segment occurs while a third segment of the plurality of segments is generated for display from the buffer, and wherein the third segment occurs before both the first segment and the second segment in the first segment sequence. For example, a third segment that occurs before the first and second segment during playback may be generated for display while the media guidance application buffers the first and second segments. The first segment may be a monologue of a character in "Grey's Anatomy Episode 1." The second segment may be a surgery scene. The third segment may be a scene in which the characters enter the surgery room. The third segment may lead into the first segment in which the one of the characters delivers a monologue.

In some embodiments, determining to buffer, at the local device, the second segment before the first segment is further in response to determining that current bandwidth conditions support buffering an additional segment of the plurality of segments while the third segment of the plurality of segments is generated for display from the buffer without stalling playback of the third segment. For example, the media guidance application may first determine whether the current bandwidth conditions can support buffering an additional segment while a third segment is generated for display. Suppose that the third threshold bit rate of the third segment is 4 Mbps. The user's data retrieval rate may be 8 Mbps. Therefore, the media guidance application can allocate 4 Mbps from the data retrieval rate to buffer additional segments.

In some embodiments, the media guidance application may determine, from the manifest file, a second segment sequence for the plurality of segments, wherein the second segment sequence corresponds to a sequence in which each segment of the plurality of segments is buffered on the local device in an order based on the threshold bit rate for each segment. For example, rather than locally determining an order by which to buffer segments, the media guidance application may refer to the manifest file for a predetermined sequence organized by threshold bit rates. Suppose the second segment sequence is ordered such that higher threshold bit rates are listed before lower threshold bit rates. If the second segment has a 10-Mbps second threshold bit rate and the first segment has a 5-Mbps first threshold bit rate, the second segment sequence may order the second segment before the first segment. Rather than retrieving and comparing the first threshold bit rate and the second threshold bit rate, the media guidance application may simply determine whether the second segment is listed before the first segment in the second segment sequence. In contrast, the second segment sequence may be organized in the opposite order, such that lower bit rates are given more priority. Thus, the first segment may be ordered before the second segment.

In some embodiments, the media guidance application may determine a third threshold bit rate for a third segment of the plurality of segments, wherein the third segment occurs before the first segment in the first segment sequence. For example, the media guidance application may determine that the third segment's threshold bit rate is 4 Mbps. The media guidance application may compare the first threshold bit rate and the third threshold bitrate to determine whether the first threshold bit rate is higher than the third threshold bit rate. For example, the first segment's threshold bit rate may be 5 Mbps, which is greater than the third segment's threshold bit rate. The media guidance application may then determine to buffer, at the local device, the third segment before the first segment in response to determining that the third threshold bit rate is not higher than the first threshold bit rate. For example, the media guidance application may proceed to buffer the third segment, followed by the first segment. This may also be because the media guidance application may be following the second segment sequence described previously where priority is given to segments with lower threshold bit rates. This may be because the data retrieval rate is simply too low to buffer very high threshold bit rates. Thus, the media guidance application may decide to buffer segments that are less than or equal to the data retrieval rate.

The media guidance application may receive a user input requesting a media asset. In response to receiving the user input, the media guidance application may identify a remote server on which the media asset is stored. The media guidance application may request a manifest file of the media asset, wherein the manifest file lists a plurality of segments that constitute the media asset, and wherein the manifest file further indicates a content rating for each segment. The media guidance application may determine a first content rating for a first segment of the plurality of segments. The media guidance application may compare the first content rating to a threshold content rating. The media guidance application may maintain the first segment on the manifest file in response to determining that the first content rating corresponds to the threshold content rating. The media guidance application may generate for display, the first segment during playback of the media asset on the local device.

The media guidance application may receive a user input requesting a media asset. It should be noted that the user can request any type of media asset. For example, suppose the user requests the song "Lose Yourself by Eminem." The song may be available as a music file that is five minutes long. This command may be received by the media guidance application through a user input interface that displays selectable music for listening.

In response to receiving the user input, the media guidance application may identify a first remote server on which the media asset is stored. In this case, the remote server can be any device that provides a service, such as file retrieval, for a client, such as the user's local device. Furthermore, the remote server can be connected to the user's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely.

The media guidance application first identifies servers that can communicate with the media guidance application (e.g., transfer files, send delivery messages etc.). The media guidance application then determines whether the media asset (e.g., "Lose Yourself by Eminem") requested by the user is on the server. If the media asset is on the server, the media guidance application identifies the server as a source for the media asset. Certain media assets may have multiple versions. For example, "Lose Yourself by Eminem" has a radio edit, an album version, and several remixes. Due to this, the media guidance application may first identify all versions of the media asset and then prompt the user to select one version.

The media guidance application may request a manifest file of the media asset, wherein the manifest file lists a plurality of segments that constitute the media asset, and wherein the manifest file further indicates a content rating for each segment. For example, the music file requested by the user, "Lose Yourself by Eminem," may be split into multiple segments (e.g., sound clips) that collectively form the song. Since "Lose Yourself by Eminem" is a song, these segments may be divided by content such as lyrics (e.g., first lyric, second lyric, etc.) or instruments (e.g., piano solo, guitar beat, etc.). Segments may also be divided equally based on time. For example, if the song has a five-minute runtime, five segments can be generated, each being a non-overlapping one-minute sound clip. Furthermore, the remote server may arbitrarily divide the media asset into segments of different lengths and sizes (e.g., disregarding beats and lyrics).

The manifest file indicates information about the plurality of segments such as the number of segments, size of each segment, length of each segment, and the content rating of each segment. The content rating of each segment may indicate the recommended audience for which the content is suitable. For example, television content in the United States is categorized as any of the following: TV-PG, TV-MA, PG-13, R, etc. The exact value of the content rating may vary based on the origin of the content. For example, Brazil indicates a number that represents the minimum age the audience should be to view the content (e.g., 10, 12, 14, 18, etc.). In some embodiments, the content rating may be any arbitrary value or symbol that describes the content. For example, a segment featuring gore may have a content rating of "R" or "TV-MA," but it may also be the term "gore" or a symbol such as a red circle. The media guidance application may refer to stored content rating database that lists each representation (e.g., symbol, number, word, etc.) along with its respective meaning. Certain segments may therefore have a content rating of TV-PG because it features a normal conversation between characters, whereas another segment may have a content rating of a red circle because it features gore and violence. In the case of audio, content ratings may classify segments with sexual lyrics and explicit language as "sexual content" or "mature content."

In some embodiments, the media guidance application may determine, from the manifest file, a first segment sequence for the plurality of segments, wherein the first segment sequence corresponds to a sequence in which each segment of the plurality of segments is displayed during playback of the media asset on a local device, wherein requesting the manifest file is in response to receiving a user input requesting a media asset. For example, when the user requests the media asset, the media guidance application may request the manifest file. The manifest file may provide a first segment sequence which orders the segments based on the order they should be played back (e.g., to maintain the plot as originally intended by the content provider or the proper order of the lyrics). If the user requests the media asset "Lose Yourself by Eminem," segment A may feature the twentieth lyric segment B may feature the twenty-first lyric. Therefore, segment A should be played back before segment B.

The media guidance application may determine a first content rating for a first segment of the plurality of segments and a second content rating for a second segment of the plurality of segments. As discussed previously, content ratings may be arbitrarily set by the content provider or may be based on a country's regulation. Alternatively, the content provider may use symbols or words to determine a separate content ratings system. If the user requests to listen to "Lose Yourself by Eminem," the media guidance application may retrieve segments from the first remote server and determine the content rating for each segment. For example, the first segment may feature a sound bite with explicit language or sexual content and thus have an "explicit" content rating. The second segment may feature a lyric that is appropriate for any audience of any age group to listen to. The content rating for the second segment may be "universal," implying that anyone can listen without fear of being exposed to explicit language, violence, or sexual content. Based on the manifest file, the media guidance application may determine these respective content ratings for the segments.

In some embodiments, the media guidance application may determine, from the manifest file, a first segment sequence for the plurality of segments, wherein the first segment sequence corresponds to a sequence in which each segment of the plurality of segments is displayed during playback of the media asset on a local device. Furthermore, determining the first content rating for the first segment of the plurality of segments and the second content rating for the second segment of the plurality of segments may be in response to determining that the media asset cannot be buffered for playback according to the first segment sequence, at current bandwidth conditions, without stalling or rebuffering. Suppose that the user is retrieving segments of the media asset from a server to his/her laptop. The laptop may be retrieving the segments at a rate of 100 kilobits per second (kbps). The song however, may have a 320-kbps bit rate. Therefore, the data retrieval rate may not be enough to buffer all bits required per second. These current bandwidth conditions thus indicate that the media asset cannot be buffered in its entirety without stalling or rebuffering. Therefore, the media guidance application may begin the process of editing manifest files to maintain the order of the first segment sequence (e.g., normal playback of the media asset) and satisfy current bandwidth conditions. The media guidance application may determine that removing segments that the user does not intend to listen to from the manifest file can satisfy the current bandwidth conditions. In response, the media guidance application may determine the content ratings of each segment.

The media guidance application may compare the first content rating to a threshold content rating. The threshold content rating represents a maximum content rating that the user can view. For example, the threshold content rating may represent a parental lock that prevents children from viewing content rated above TV-PG. If content ratings are symbols that represent elements such as gore, nudity, or violence (e.g., red circle, brown circle, red triangle, respectively), the threshold content rating may serve as a filter. Therefore, any segments associated with a content rating of a red circle or red triangle may blocked by a threshold content rating that filters out gore and violence. Based on the previous example, the media guidance application may determine that the first content rating is "explicit." If the threshold content rating is a filter that only accepts "universal" content ratings, the media guidance application may determine that the first content rating exceeds the threshold content rating.

The media guidance application may compare the second content rating to a threshold content rating. For example, the media guidance application may determine that the second content rating is "universal" and the threshold content rating is also "universal." Therefore, the second content rating corresponds to the threshold content rating. In some embodiments, the threshold content rating is determined by a user preference. For example, a parental guidance lock retrieved from a user profile may indicate that content ratings that are not "universal" are not allowable for listening. The parental guidance lock provides the threshold content rating of "universal." In some embodiments, the threshold content rating is determined by a content provider. For example, the content provider may use symbols to rate segments with explicit language. The content provider may provide a child-friendly or "clean" version of the content by providing a threshold content rating that can filter out segments with explicit/sexual language.

The media guidance application may remove the first segment from the manifest file in response to determining that the first content rating does not correspond to the threshold content rating. For example, upon determining that the first content rating of "explicit" does not satisfy the threshold content rating of "universal," the media guidance application may remove the first segment from the manifest file. Therefore, during buffering, the first segment may not be buffered. Suppose that a segment represents a word of a lyric. The media guidance application may determine that the word has an "explicit" content rating, which does not satisfy the "universal" threshold content rating, and the media guidance application may remove the word (i.e., segment) from the manifest file.

The media guidance application may maintain the second segment on the manifest file in response to determining that the second content rating corresponds to the threshold content rating. For example, the media guidance application may determine that the second content rating of "universal" corresponds to the threshold content rating of "universal." Therefore, the second segment may be left on the manifest file.

The media guidance application may buffer, at the local device, the second segment in response to determining that the second segment is listed on the manifest file. For example, the media guidance application may buffer, to the user's laptop, the segment from "Lose Yourself by Eminem," which features a non-explicit lyric.

The media guidance application may generate, from the buffer, the second segment during playback of the media asset on the local device. For example, the media guidance application may generate the second segment for listening from "Lose Yourself by Eminem."

In some embodiments, the media guidance application may buffer the second segment, at the local device, while a third segment of the plurality of segments is generated from the buffer. For example, while the media guidance application buffers the sound clip featuring the "universal" lyric, the media guidance application may generate, for listening, a sound clip of a lyric that comes before the lyric being buffered. Thus, the user is not simply waiting for all segments to buffer. Buffering and generating occur in parallel.

In some embodiments, buffering, at the local device, second segment is in response to determining that current bandwidth conditions support buffering an additional segment of the plurality of segments while a third segment of the plurality of segments is generated from the buffer without stalling playback of the third segment. For example, if the data retrieval rate for the user's laptop is 1 Mbps and the music file segment's bit rate is 320 kbps, the media guidance application may determine that the current bandwidth conditions allow for the third segment to be generated for listening and for an additional segment to be buffered at the local device. If these tasks cannot be performed in parallel due to the current bandwidth conditions, the media guidance application may not buffer additional segments until the current bandwidth conditions change.

In some embodiments, the media guidance application may determine, from the manifest file, a second segment sequence for the plurality of segments, wherein the second segment sequence corresponds to a sequence in which each segment of the plurality of segments is buffered on the local device in an order based on the content rating for each segment. For example, in the case of video, the media asset may be split into five segments on the remote server. Three of the segments may be associated with a content rating of TV-PG, whereas two segments may be associated with a content rating of TV-MA. The second segment sequence may order the three segments associated with a content rating of TV-PG before the two segments associated with a content rating of TV-MA. If the threshold content rating is TV-PG, the second segment sequence conveniently allows the media guidance application to remove the last two segments from the manifest file without individually comparing the respective content ratings with the threshold content rating.

In some embodiments, the second segment sequence corresponds to the first segment sequence after the first segment is removed. For example, if the media guidance application removed the first segment from the manifest file because the first content rating did not correspond to the threshold content rating, the first segment sequence may be referred to as the second segment sequence (e.g., modified version of the first segment sequence). For the example of "Lose Yourself by Eminem," the second segment sequence may represent a "clean" or "non-explicit" version of the song.

In some embodiments, the media guidance application may request the manifest file from a second remote server. For example, data associated with the media asset may be distributed over multiple servers. The first server may hold the media asset's segments, while the second remote server may hold the media asset's manifest file and metadata.

Figure 2:
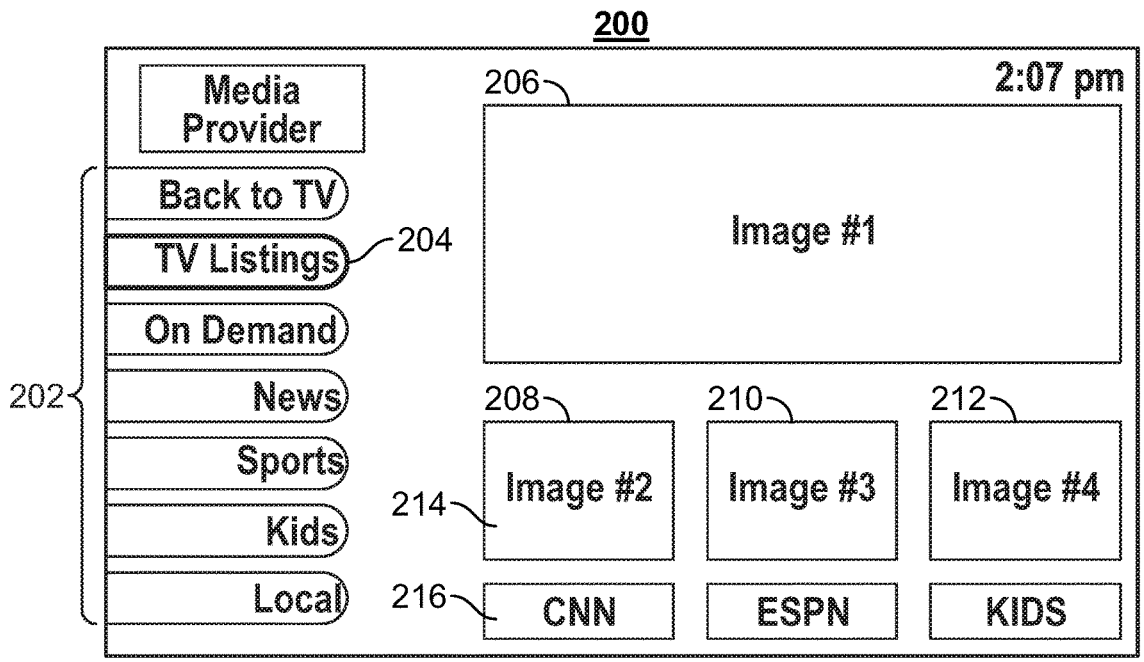

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
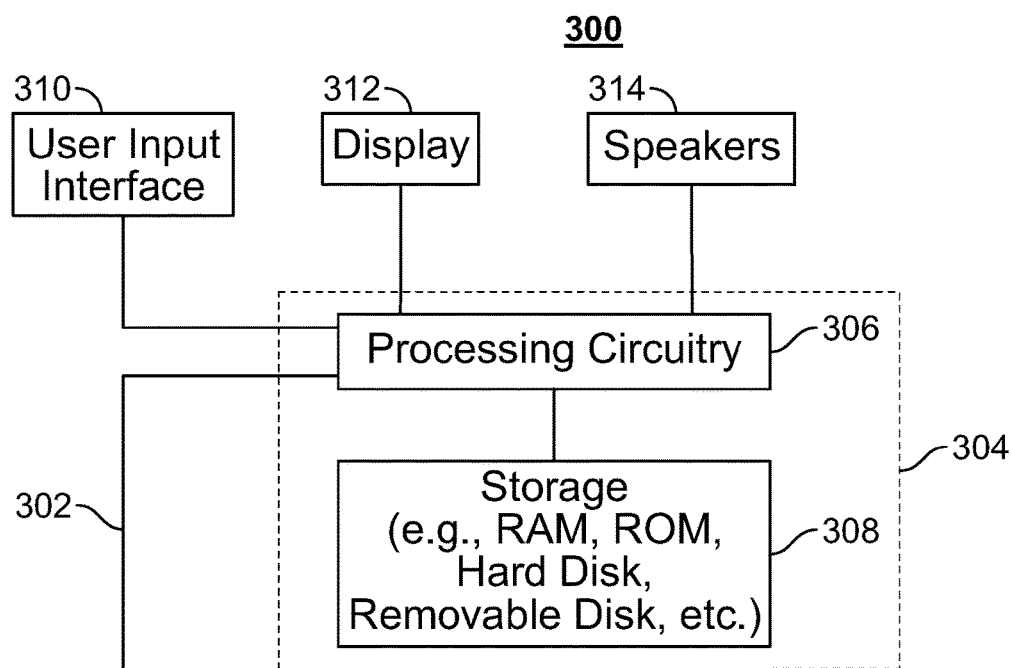
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
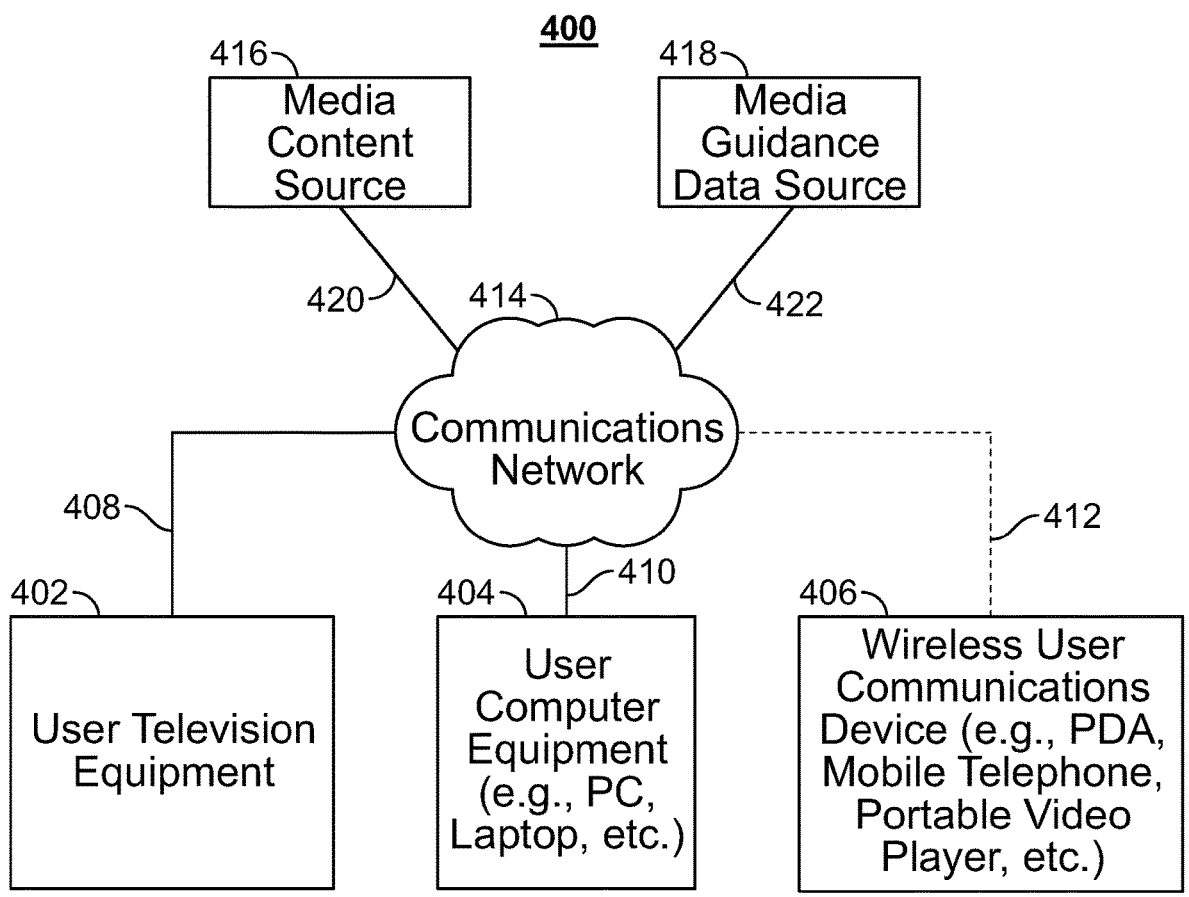
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
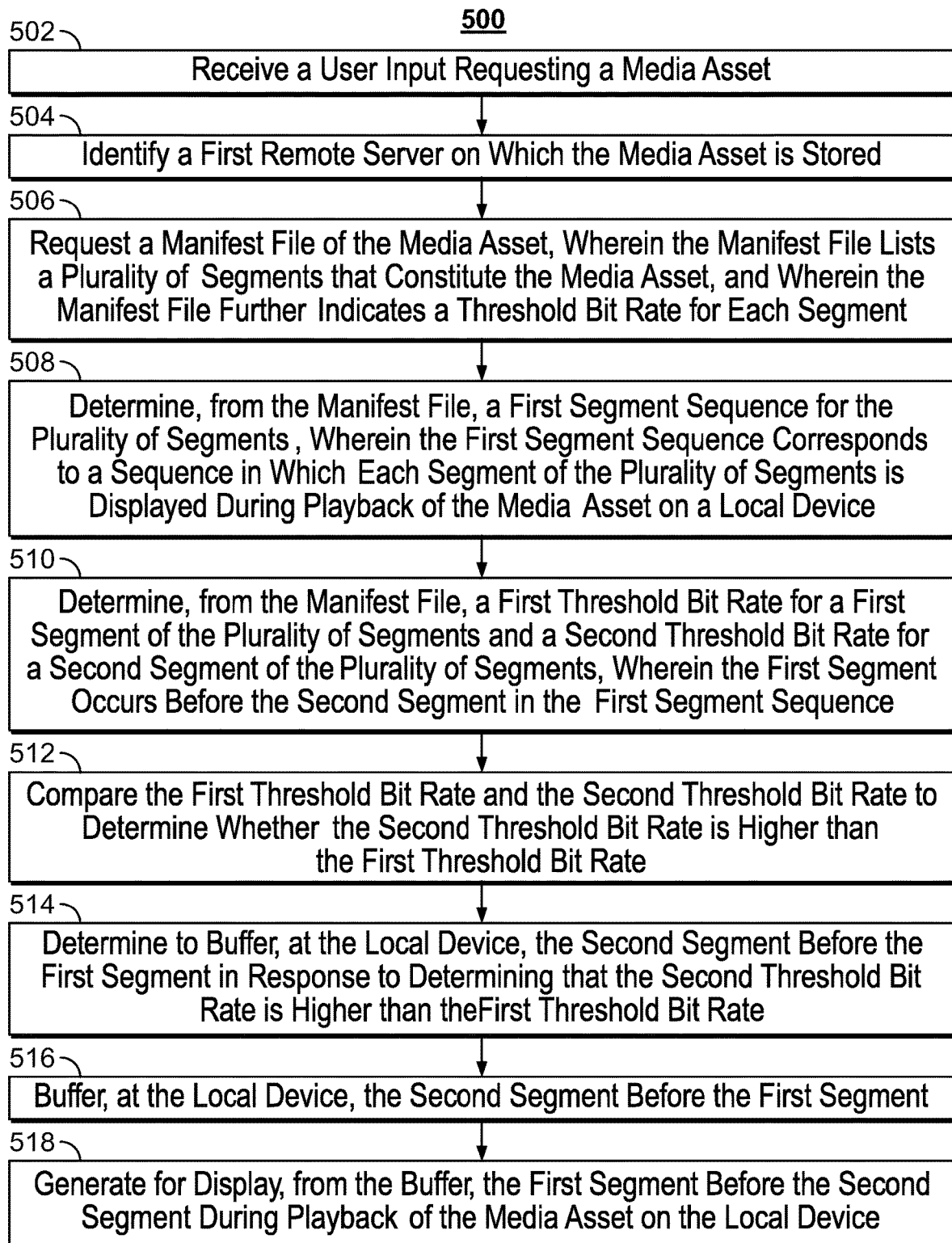
FIG. 5 is a flowchart of a detailed illustrative process for improving quality of service while streaming code-agnostic content in accordance with some embodiments of the disclosure.

FIG. 5 is a flowchart of illustrative steps of a process 500 for improving quality of service while streaming code-agnostic content in accordance with some embodiments of the disclosure. It should be noted that process 500 or any step thereof could be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to improve quality of service while streaming code-agnostic content. In addition, one or more steps of process 500 may be incorporated into or combined with one or more steps of any other process or embodiment (e.g., as described in relation to FIGS. 6-11).

At step 502, the media guidance application receives a user input requesting a media asset (e.g., from the I/O path 302 (FIG. 3)). For example, the user may request a video "Mission Impossible" that he/she wants to view. This command may be received by the media guidance application through a user input interface that displays selectable videos for viewing (e.g., user input interface 310 on display 312 (FIG. 3)). Furthermore, the user may initiate this request on user television equipment 402, user computer equipment 404, or a wireless communications device 406.

At step 504, the media guidance application identifies a first remote server on which the media asset is stored (e.g., part of the communications network 414 (FIG. 4)). The first remote server may serve as the media content source 416 which receives the user's device's request through the communications path 420. The remote server can be any device that provides a service, such as file retrieval, for a client, such as the user's local device. The remote server can be connected to the user's local area network (LAN) as a remote access server (RAS), or may be a part of the local area network itself (e.g., LAN server). Upon receiving a request for a media asset, the media guidance application may broadcast a search query to determine a remote server that has the media asset. When a remote server receives the search query (e.g., via communications path 420 (FIG. 4)), it may send an acknowledgment message confirming receipt of the broadcast message. A remote server may search its database for the media asset. If the media asset is found in the database of a remote server, the remote server may send a message to the media guidance application (e.g., via communications path 420 (FIG. 4)) indicating possession of the media asset. In response, the media guidance application may identify the first remote server on which the media asset is stored.

At step 506, the media guidance application requests a manifest file of the media asset (e.g., via communications path 420 (FIG. 4)), wherein the manifest file lists a plurality of segments that constitute the media asset, and wherein the manifest file further indicates a threshold bit rate for each segment. For example, the video requested by the user, "Mission Impossible," may be split into multiple segments (e.g., video clips) that collectively form the video. Since "Mission Impossible" is a movie, these segments may be divided by content such as plot points (e.g., first scene, second scene, etc.). The manifest file indicates information about the plurality of segments such as the number of segments, size of each segment, length of each segment, and the threshold bit rate of each segment. The media guidance application may store the manifest file in storage 308 (FIG. 3). The threshold bit rate for each segment is the number of bits per second that can be transmitted along a digital network, which are required to maintain a predetermined minimum video resolution during playback of each respective segment. For example, in order to view "Mission Impossible" in high-definition (e.g., video resolution of 1280×720 px), each segment may have an associated bit rate to maintain the high-definition resolution throughout the entire movie.

At step 508, the media guidance application determines, from the manifest file, (e.g., via control circuitry 304 (FIG. 3)) a first segment sequence for the plurality of segments, wherein the first segment sequence corresponds to a sequence in which each segment of the plurality of segments is displayed during playback of the media asset on a local device (e.g., user television equipment 402, user computer equipment 404, wireless communications device 406). If the user requests the media asset "Mission Impossible," segment A may feature an argument between characters and segment B may feature a brawl between the characters in response to the argument. Therefore, segment A should be played back before segment B.

At step 510, the media guidance application determines, from the manifest file, (e.g., via control circuitry 304 (FIG. 3)) a first threshold bit rate for a first segment of the plurality of segments and a second threshold bit rate for a second segment of the plurality of segments, wherein the first segment occurs before the second segment in the first segment sequence. Suppose that the user wants to view "Mission Impossible" in high-definition resolution (e.g., 720p) and each scene has a 24-fps frame rate. The bit rate for the first segment, a monologue scene, may be 5 Mbps (i.e., megabits per second). The bit rate of the second segment, an action scene, may be 8 Mbps. Furthermore, the monologue scene may appear before the action scene in normal playback of the movie.

At step 512, the media guidance application compares (e.g., via control circuitry 304 (FIG. 3)) the first threshold bit rate and the second threshold bit rate to determine whether the second threshold bit rate is higher than the first threshold bit rate. Continuing from the previous example, the media guidance application may determine that the second segment has a second threshold bit rate of 8 Mbps, which is higher than the first threshold bit rate of 5 Mbps.

At step 514, the media guidance application determines (e.g., via control circuitry 304 (FIG. 3)) to buffer, at the local device, the second segment before the first segment in response to determining that the second threshold bit rate is higher than the first threshold bit rate. The media guidance application may buffer the segments to user equipment devices 402, 404, and/or 406 via the communications path 420 (FIG. 4). In the previous example, since the second segment has a greater bit rate, the media guidance application may determine that the second segment contains more information. In order to ensure that the second segment is fully buffered, the media guidance application may determine that the second segment should be buffered before the first segment. This ensures that even if the data retrieval rate from the server drops over the communications path 420, the user can view both segments without any degradation in quality.

At step 516, the media guidance application buffers (e.g., via control circuitry 304 (FIG. 3)), at the local device, the second segment before the first segment. The media guidance application may temporarily store the buffered segment in storage 308 (e.g., RAM, ROM, Hard Disk, Removable Disk, etc.) from FIG. 3. Once the user has viewed the segment, the media guidance application may remove the temporarily stored segments that were buffered.

At step 518, the media guidance application generates for display (e.g., on display 312 (FIG. 3)), from the buffer, the first segment before the second segment during playback of the media asset on the local device. In some embodiments, the media guidance application may overlay a user input interface 310 (FIG. 3) to allow the user to select options that pause, rewind, fast-forward, etc. the media asset. In this case, the media guidance application generates the first segment for display before the second segment based on the first segment sequence. Even though the second segment is buffered before the first segment, the first segment sequence indicates that the first segment should be played back before the second segment.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 5.

Figure 6:
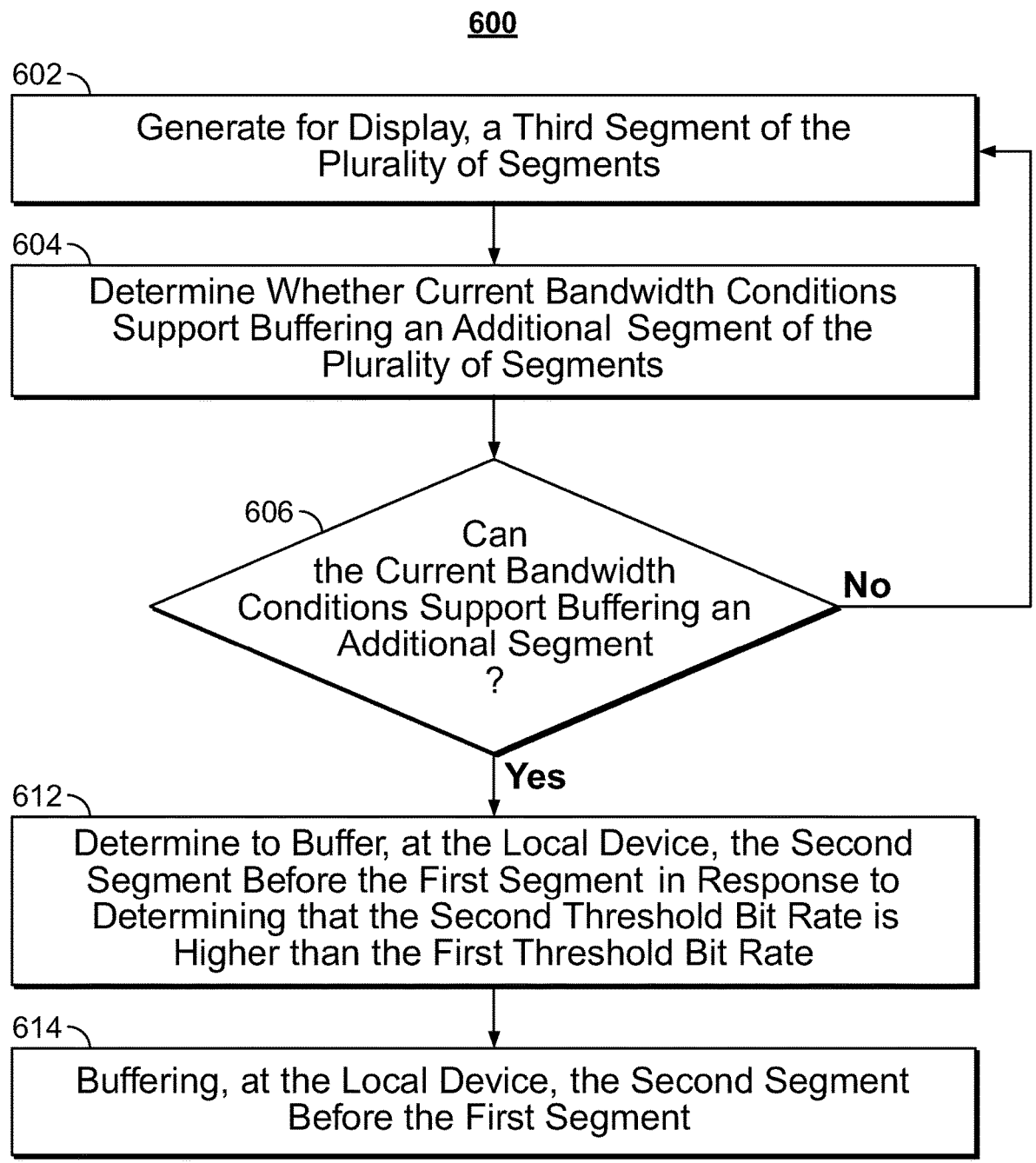
FIG. 6 is a flowchart of a detailed illustrative process for determining whether additional segments can be buffered based on current bandwidth conditions, in accordance with some embodiments of the disclosure.

FIG. 6 is a flowchart of illustrative steps of a process 600 for determining whether additional segments can be buffered based on current bandwidth conditions, in accordance with some embodiments of the disclosure. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether additional segments can be buffered based on current bandwidth conditions. In addition, one or more steps of process 600 may be incorporated into or combined with one or more steps of any other process or embodiment (e.g., as described in relation to FIGS. 5 and 7-11).

At step 602, the media guidance application generates for display (e.g., on display 312 (FIG. 3)), a third segment of the plurality of segments. The third segment may be a part of the media asset that occurs before the first and second segment in terms of playback. For example, the third segment may be the introductory scene of the movie "Mission Impossible."

At step 604, the media guidance application determines (e.g., via control circuitry 304 (FIG. 3)) whether the current bandwidth conditions support buffering an additional segment of the plurality of segments. The media guidance application may determine the data retrieval rate of the user's local device. The data retrieval rate is the speed at which bits are traveling over the communication path 420 from the media content source 416 (e.g., the remote server) to the user's local device. The data retrieval rate represents the current bandwidth condition. For example, if the data retrieval rate is 5 Mbps and a segment's bit rate is 1 Mbps, the media guidance application may determine that 4 Mbps of the data retrieval rate can be used for other purposes. At step 606, the media guidance application decides whether the current bandwidth conditions can support buffering an additional segment.

At step 612, in response to determining that the current bandwidth conditions can support buffering additional segments, the media guidance application determines (e.g., via control circuitry 304 (FIG. 3)) to buffer, at the local device, the second segment before the first segment in response to determining that the second threshold bit rate is higher than the first threshold bit rate. The media guidance application may determine (e.g., via control circuitry 304 (FIG. 3)) that the second threshold bit rate is higher than the first threshold bit rate. Therefore, the second segment may require additional time to buffer, or may not be buffered if the bandwidth conditions change. It should be noted that the media guidance application may temporarily store the buffered segments in storage 308 (FIG. 3). Once the viewer has seen the respective segment or the media asset in its entirety, the media guidance application may remove the stored segments from storage. In response to determining that the current bandwidth conditions cannot support buffering additional segments, the process returns to step 602 in which the media guidance application continues to display the third segment.

At step 614, the media guidance application buffers (e.g., via control circuitry 304 (FIG. 3)), at the local device, the second segment before the first segment. This step occurs in response to the media guidance application determining that the second threshold bit rate is higher than the first threshold bit rate.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 6.

Figure 7:
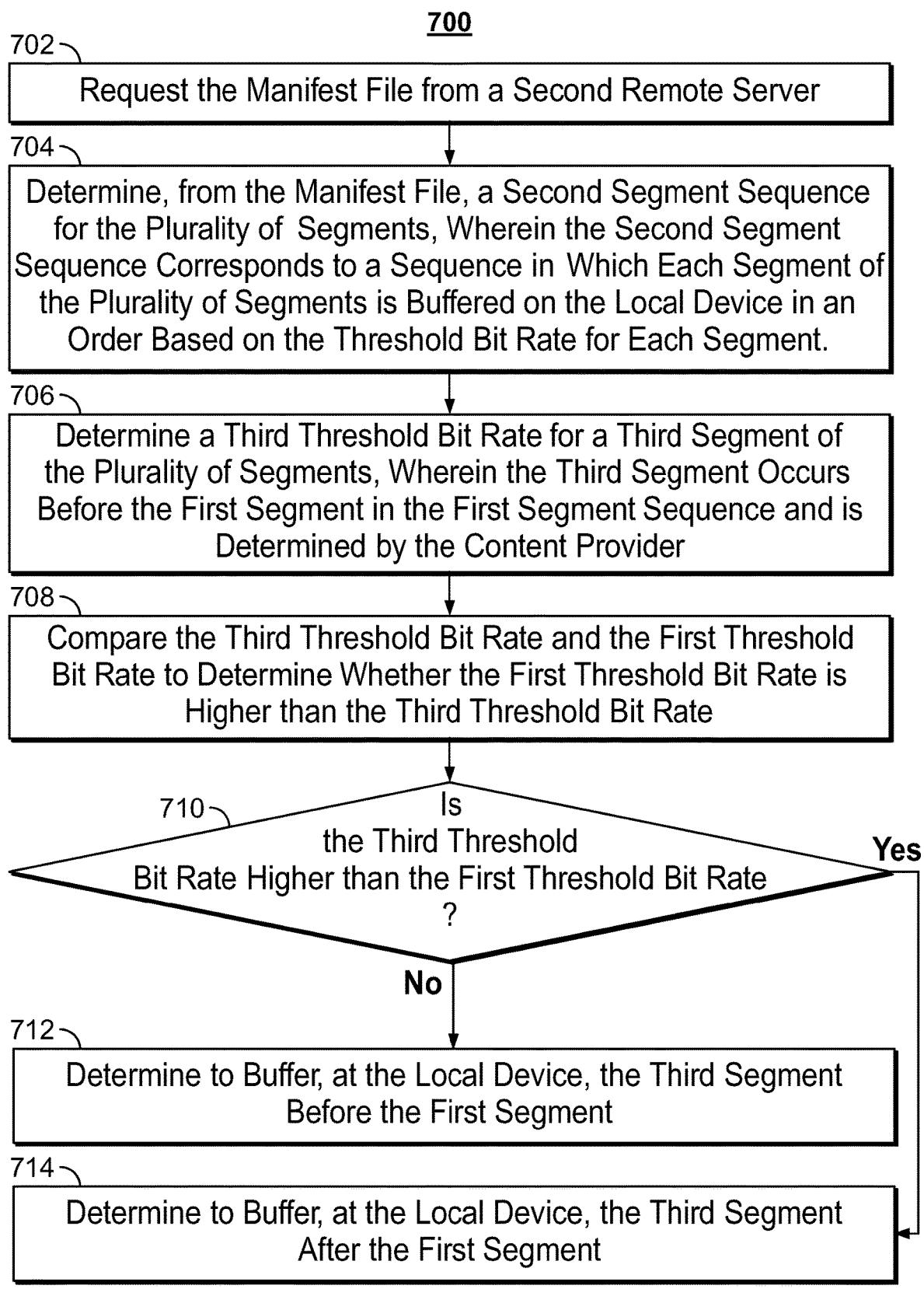
FIG. 7 is a flowchart of a detailed illustrative process for buffering on the local device in an order based on the threshold bit rate for each segment, in accordance with some embodiments of the disclosure.

FIG. 7 is a flowchart of illustrative steps of a process 700 for buffering on the local device in an order based on the threshold bit rate for each segment, in accordance with some embodiments of the disclosure. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to buffer on the local device in an order based on the threshold bit rate for each segment. In addition, one or more steps of process 700 may be incorporated into or combined with one or more steps of any other process or embodiment (e.g., as described in relation to FIGS. 5-6 and 8-11).

At step 702, the media guidance application requests (via the communication path 420 or 422 (FIG. 4)) the manifest file from a second remote server. It should be noted that multiple servers may possess files associated with the media asset. For example, a second remote server may store segments of the media asset, metadata about the media asset, and the manifest file. The second remote server may therefore be considered the media guidance data source 418 (FIG. 4) or the media content source 416 (FIG. 4).

At step 704, the media guidance application determines (e.g., via control circuitry 304 (FIG. 3)), from the manifest file, a second segment sequence for the plurality of segments, wherein the second segment sequence corresponds to a sequence in which each segment of the plurality of segments is buffered on the local device in an order based on the threshold bit rate for each segment. For example, the second segment sequence may list the segments in order of rising threshold bit rates. Thus, segments with lower threshold bit rates may be listed before segments with higher threshold bit rates. The second segment sequence may also be organized in the opposite manner.

At step 706, the media guidance application determines (e.g., via control circuitry 304 (FIG. 3)) a third threshold bit rate for a third segment of the plurality of segments, wherein the third segment occurs before the first segment in the first segment sequence and is determined by the content provider. The first segment sequence orders segments chronologically based on playback. It may list the third segment before the first segment, thus implying that the third segment is meant to be played back before the first segment.

At step 708, the media guidance application compares (e.g., via control circuitry 304 (FIG. 3)) the third threshold bit rate and the first threshold bitrate to determine whether the first threshold bit rate is higher than the third threshold bit rate. For example, the third threshold bit rate may be 10 Mbps and the first threshold bit rate may be 5 Mbps.

At step 710, the media guidance application decides (e.g., via control circuitry 304 (FIG. 3)) whether the third threshold bit rate is higher than the first threshold bit rate. Based on the previous example, the media guidance application may determine that the third threshold bit rate is higher than the first threshold bit rate. Suppose that the third threshold bit rate is 5 Mbps and the first threshold bit rate is 7 Mbps. In this situation, the media guidance application may determine that the third threshold bit rate is not higher than the first threshold bit rate.

At step 712, in response to determining that the third threshold bit rate is not higher than the first threshold bit rate, the media guidance application determines (e.g., via control circuitry 304 (FIG. 3)) to buffer, at the local device, the third segment before the first segment. In this case, the media guidance application may give priority to buffering segments with lower threshold bit rates. This may be because the data retrieval rate over communication paths 420 or 422 (FIG. 4) is too low to buffer segments with high threshold bit rates. Rather than displaying nothing at all, the media guidance application may execute a best-effort attempt to display parts of the media asset.

At step 714, in response to determining that the third threshold bit rate is higher than the first threshold bit rate, the media guidance application determines (e.g., via control circuitry 304 (FIG. 3)) to buffer, at the local device, the third segment after the first segment. This is motivated by the reason noted previously (e.g., the media guidance application may determine that the data retrieval rate is too low to buffer segments with high threshold bit rates).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 7.

Figure 8:
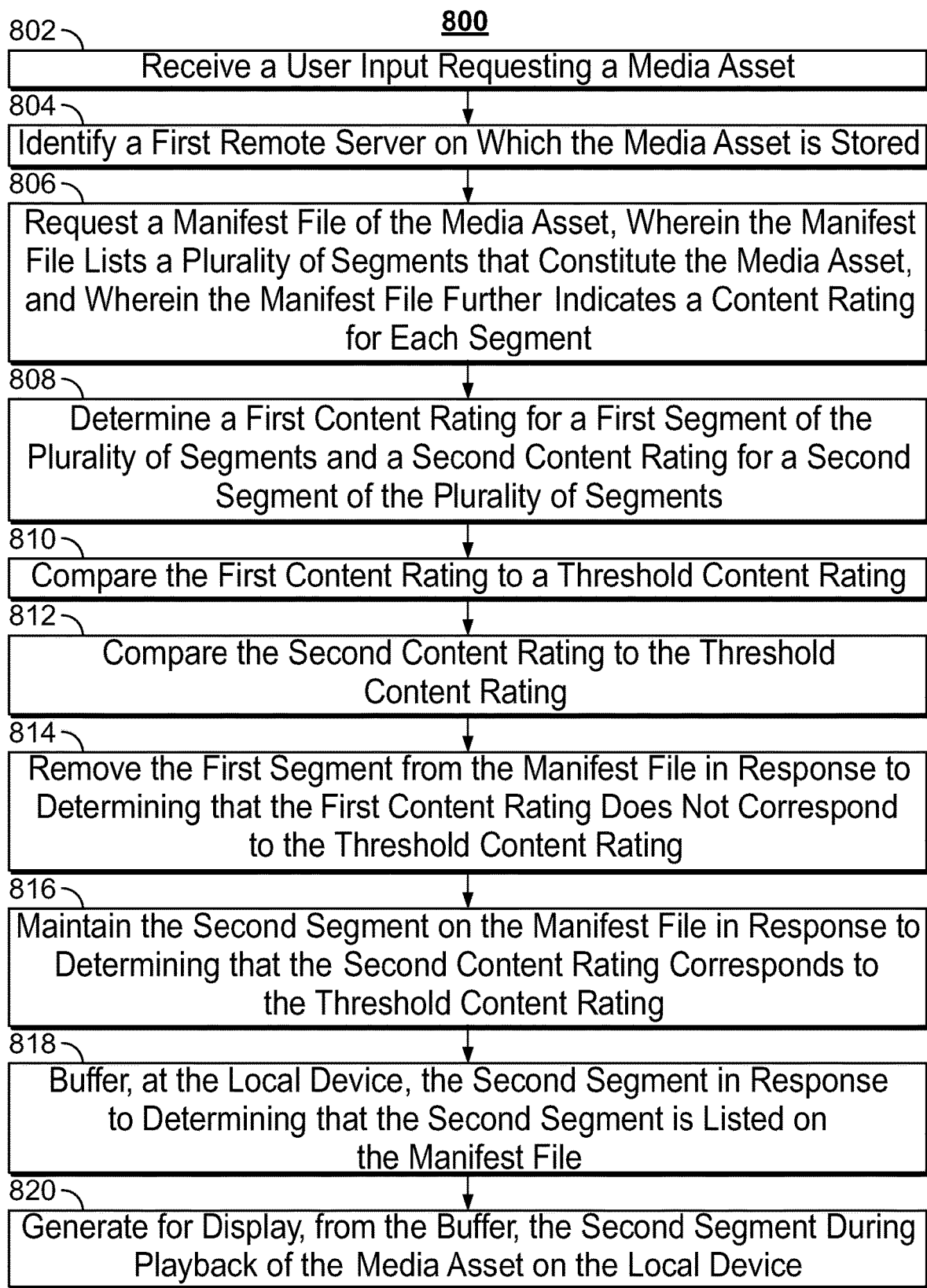
FIG. 8 is a flowchart of a detailed illustrative process for improving quality of service while streaming code-agnostic content by editing manifest files, in accordance with some embodiments of the disclosure.

FIG. 8 is a flowchart of illustrative steps of a process 800 for improving quality of service while streaming code-agnostic content by editing manifest files in accordance with some embodiments of the disclosure. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to improve quality of service while streaming code-agnostic content by editing manifest files. In addition, one or more steps of process 800 may be incorporated into or combined with one or more steps of any other process or embodiment (e.g., as described in relation to FIGS. 5-7 and 9-11).

At step 802, the media guidance application receives a user input requesting a media asset (e.g., from the I/O path 302 (FIG. 3)). For example, the user may request a video "Game of Thrones Episode 5" that he/she wants to view. This command may be received by the media guidance application through a user input interface that displays selectable videos for viewing (e.g., user input interface 310 on display 312 (FIG. 3)). Furthermore, the user may initiate this request on user television equipment 402, user computer equipment 404, or a wireless communications device 406.

At step 804, the media guidance application identifies a first remote server on which the media asset is stored (e.g., part of the communications network 414 (FIG. 4)). The first remote server may serve as the media content source 416 which receives the user's device's request through the communications path 420. The remote server can be any device that provides a service, such as file retrieval, for a client, such as the user's local device. The remote server can be connected to the user's local area network (LAN) as a remote access server (RAS), or may be a part of the local area network itself (e.g., LAN server). Upon receiving a request for a media asset, the media guidance application may broadcast a search query to determine a remote server that has the media asset. When a remote server receives the search query (e.g., via communications path 420 (FIG. 4)), it may send an acknowledgment message confirming receipt of the broadcast message. A remote server may search its database for the media asset. If the media asset is found in the database of a remote server, the remote server may send a message to the media guidance application (e.g., via communications path 420 (FIG. 4)) indicating possession of the media asset. In response, the media guidance application may identify the first remote server on which the media asset is stored.

At step 806, the media guidance application requests a manifest file of the media asset (e.g., from the media content source 416 (FIG. 4)), wherein the manifest file lists a plurality of segments that constitute the media asset, and wherein the manifest file further indicates a content rating for each segment. For example, the video requested by the user, "Game of Thrones Episode 5," may be split into multiple segments (e.g., video clips) that collectively form the video. Since "Game of Thrones Season 5" is a television show, these segments may be divided by content such as plot points (e.g., first scene, second scene, etc.). Segments may also be divided equally based on time. For example, if the movie has a two-hour runtime, twenty segments can be generated, each being a non-overlapping six-minute clip. Furthermore, the remote server may arbitrarily divide the media asset into segments of different lengths and sizes (e.g., disregarding plot points).

The manifest file indicates information about the plurality of segments such as the number of segments, size of each segment, length of each segment, and the content rating of each segment. The media guidance application may further store the manifest file in storage 308 (FIG. 3). The content rating of each segment may indicate the recommended audience for which the content is suitable (e.g., TV-PG, TV-MA, PG-13, R, etc.). The exact value of the content rating may vary based on the origin of the content. For example, Brazil indicates a number that represents the minimum age the audience should be to view the content (e.g., 10, 12, 14, 18, etc.). In some embodiments, the content rating may be any arbitrary value or symbol that describes the content. For example, a segment featuring gore may have a content rating of "R" or "TV-MA," but it may also be the term "gore" or a symbol such as a red circle. The media guidance application may refer to stored content rating database that lists each representation (e.g., symbol, number, word, etc.) along with its respective meaning. Certain segments may therefore have a content rating of TV-PG because it features a normal conversation between characters, whereas another segment may have a content rating of a red circle because it features gore and violence.

At step 808, the media guidance application determines (e.g., via control circuitry 304 (FIG. 3)) a first content rating for a first segment of the plurality of segments and a second content rating for a second segment of the plurality of segments. As discussed previously, content ratings may be arbitrarily set by the content provider or may be based on a country's regulation. Suppose the media asset originates from the United States. The content ratings for a television program will range from TV-Y (i.e., appropriate for all children) to TV-MA (i.e., specifically designed to be viewed by adults). Alternatively, the content provider may use symbols or words to determine a separate content ratings system. If the user requests to view "Game of Thrones Episode 5," the media guidance application may retrieve segments from the first remote server and determine the content rating for each segment. For example, the first segment may feature a scene with nudity and thus have a TV-MA content rating. The second segment may feature a scene of a normal conversation between characters and have a TV-PG content rating. Based on the manifest file, the media guidance application may determine these respective content ratings for the segments.

At step 810, the media guidance application compares (e.g., via control circuitry 304 (FIG. 3)) the first content rating to a threshold content rating. The threshold content rating represents a maximum content rating that the user can view. For example, the threshold content rating may represent a parental lock that prevents children from viewing content rated above TV-PG. If content ratings are symbols that represent elements such as gore, nudity, or violence (e.g., red circle, brown circle, red triangle, respectively), the threshold content rating may serve as a filter. Therefore, any segments associated with a content rating of a red circle or red triangle may blocked by a threshold content rating that filters out gore and violence. Based on the previous example, the media guidance application may determine that the first content rating is TV-MA. If the threshold content rating is TV-PG, the media guidance application may determine that the first content rating exceeds the threshold content rating.

In some embodiments, the threshold content rating is determined by user preference. For example, the media guidance application may retrieve a user profile (e.g., from storage 308 (FIG. 3)) that indicates a threshold content rating. If multiple user profiles are retrieved because the media guidance application is used by multiple users, the media guidance application may prompt the user to identify a new threshold content rating or his/her user profile (e.g., via the user input interface 310 (FIG. 3)).

At step 812, the media guidance application compares (e.g., via control circuitry 304 (FIG. 3)) the second content rating to a threshold content rating. For example, the media guidance application may determine that the second content rating is TV-PG and the threshold content rating is also TV-PG. Therefore, the second content rating corresponds to the threshold content rating.

In some embodiments, the threshold content rating is determined by a content provider. Accordingly, the media guidance application may retrieve the threshold content rating from the media guidance data source 418 (FIG. 4). For example, the content provider may use symbols to rate segments with explicit language. The content provider may provide a child-friendly version of the content by providing a threshold content rating that can filter out segments with explicit language.

At step 814, the media guidance application removes (e.g., via control circuitry 304 (FIG. 3)) the first segment from the manifest file in response to determining that the first content rating does not correspond to the threshold content rating. The media guidance application may retrieve the manifest file from storage 308, make the updates indicated above, and store the new manifest file in storage 308 (FIG. 3). For example, upon determining that the first content rating of TV-MA exceeds the threshold content rating of TV-PG, the media guidance application may remove the first segment from the manifest file. Therefore, during buffering, the first segment may not be buffered.

At step 816, the media guidance application maintains the second segment on the manifest file in response to determining that the second content rating corresponds to the threshold content rating. For example, the media guidance application may determine that the second content rating of TV-PG corresponds to the threshold content rating of TV-PG. Therefore, the second segment may be left on the manifest file.

At step 818, the media guidance application buffers (e.g., via control circuitry 304 (FIG. 3)), at the local device, the second segment in response to determining that the second segment is listed on the manifest file. For example, the media guidance application may buffer, to the user's smartphone (e.g., wireless user communications device 406 (FIG. 4)), the scene in "Game of Thrones Episode 5," which features a normal conversation between characters. The media guidance application may temporarily store the second segment in storage 308 (FIG. 3), until the user has viewed the media asset.

At step 820, the media guidance application generates (e.g., via control circuitry 304 (FIG. 3)) for display, from the buffer, the second segment during playback of the media asset on the local device. For example, the media guidance application may display (e.g., on display 312 (FIG. 3)) the scene featuring a normal conversation between characters, on the user's smartphone, for viewing.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 8.

Figure 9:
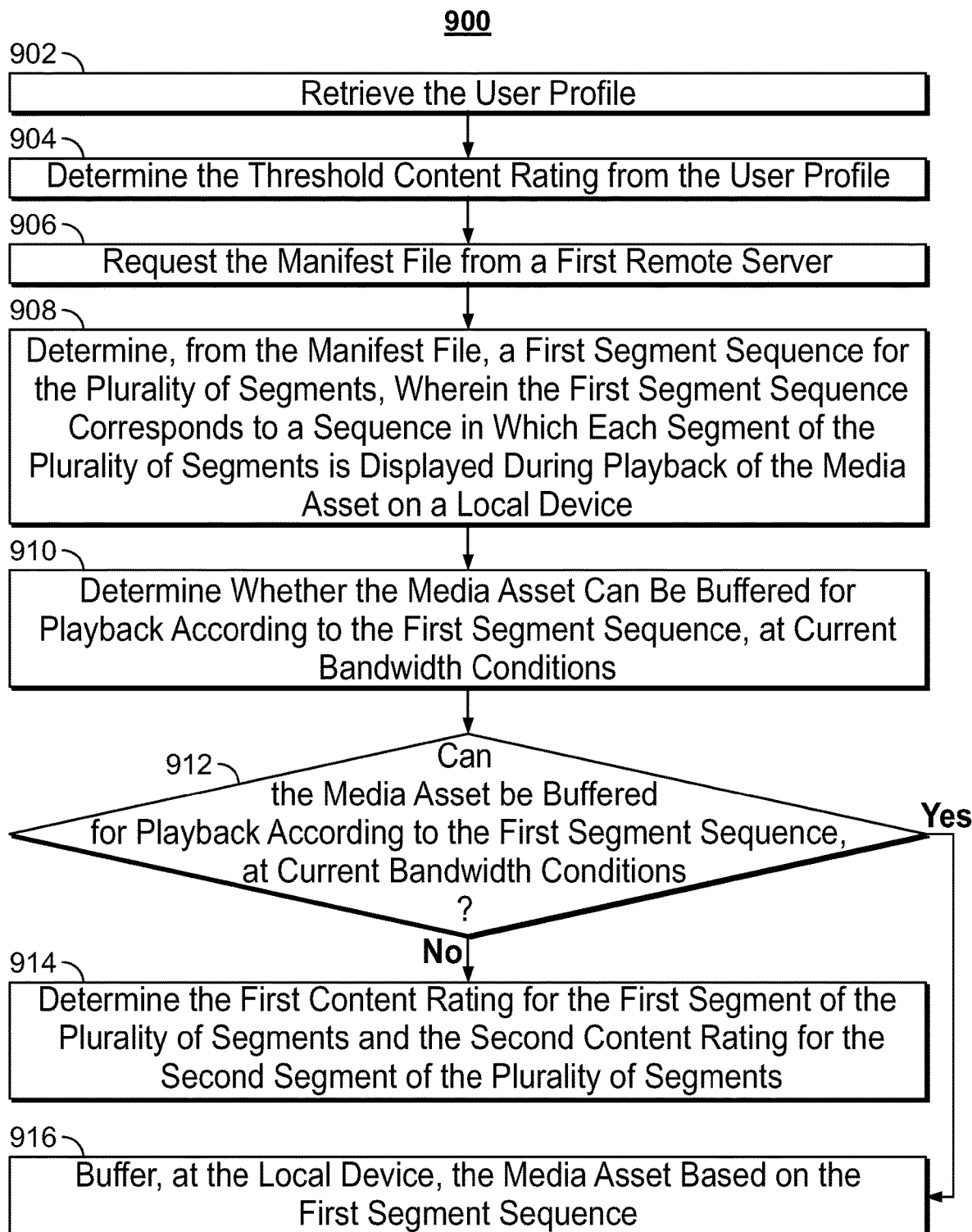
FIG. 9 is a flowchart of a detailed illustrative process for determining whether a media asset can be buffered for playback according to a first segment sequence at the current bandwidth conditions, in accordance with some embodiments of the disclosure.

FIG. 9 is a flowchart of illustrative steps of a process 900 for determining whether a media asset can be buffered for playback according to a first segment sequence at the current bandwidth conditions, in accordance with some embodiments of the disclosure. It should be noted that process 900 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to determine whether a media asset can be buffered for playback according to a first segment sequence at the current bandwidth conditions. In addition, one or more steps of process 900 may be incorporated into or combined with one or more steps of any other process or embodiment (e.g., as described in relation to FIGS. 5-8 and 10-11).

At step 902, the media guidance application retrieves the user profile (e.g., from storage 308 (FIG. 3)). The user profile may include information such as the user's viewing history, setting preferences (e.g., subtitles, audio, video, etc.), and parental locks.

At step 904, the media guidance application determines (e.g., via control circuitry 304 (FIG. 3)) the threshold content rating from the user profile. For example, the parental locks in the user profile may indicate a threshold content rating and any media asset with a content rating above that threshold content rating may in turn be blocked.

At step 906, the media guidance application requests (e.g., via the communications path 420 (FIG. 4)) the manifest file from a first remote server (e.g., media content source 416 (FIG. 4)). The manifest file may include information such as the number of segments that make up the media asset and the duration, content rating, and threshold bit rate of each segment. The manifest file may get stored (e.g., in storage 308 (FIG. 3)) by the media guidance application.

At step 908, the media guidance application determines (e.g., via control circuitry 304 (FIG. 3)), from the manifest file, a first segment sequence for the plurality of segments, wherein the first segment sequence corresponds to a sequence in which each segment of the plurality of segments is displayed during playback of the media asset on a local device. The first segment sequence, as discussed before, may be the order in which the media asset is intended to be viewed or listened to by the content provider.

At step 910, the media guidance application determines (e.g., via control circuitry 304 (FIG. 3)) whether the current bandwidth conditions support buffering the media asset based on the first segment sequence. The media guidance application may determine the data retrieval rate of the user's local device. The data retrieval rate is the speed at which bits are traveling over the communication path 420 from the media content source 416 (e.g., the remote server) to the user's local device. The data retrieval rate represents the current bandwidth condition. For example, if the data retrieval rate is 5 Mbps and a segment's bit rate is 1 Mbps, the media guidance application may determine that 4 Mbps of the data retrieval rate can be used for other purposes. If the data retrieval rate is less than 1 Mbps, the media guidance application may determine that the media asset cannot be buffered based on the first segment sequence. At step 912, the media guidance application decides whether the current bandwidth conditions can support buffering the media asset based on the first segment sequence.

At step 914, in response to determining that the media asset cannot be buffered for playback according to the first segment sequence at current bandwidth conditions, the media guidance application determines (e.g., via control circuitry 304 (FIG. 3)) the first content rating for the first segment of the plurality of segments and the second content rating for the second segment of the plurality of segments. The purpose behind this step is for the media guidance application to find, based on content rating preferences of the user or content provider, segments that do not have to be buffered. This would allow the media asset to be buffered based on the first segment sequence.

At step 916, in response to determining that the media asset can be buffered for playback according to the first segment sequence at current bandwidth conditions, the media guidance application buffers (e.g., via control circuitry 304 (FIG. 3)), at the local device, the media asset based on the first segment sequence. If the media guidance application determines that there is no need to alter the manifest file based on the content ratings because the current bandwidth conditions are sufficient, the media guidance application may directly proceed to buffering the first segment.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 9.

Figure 10:
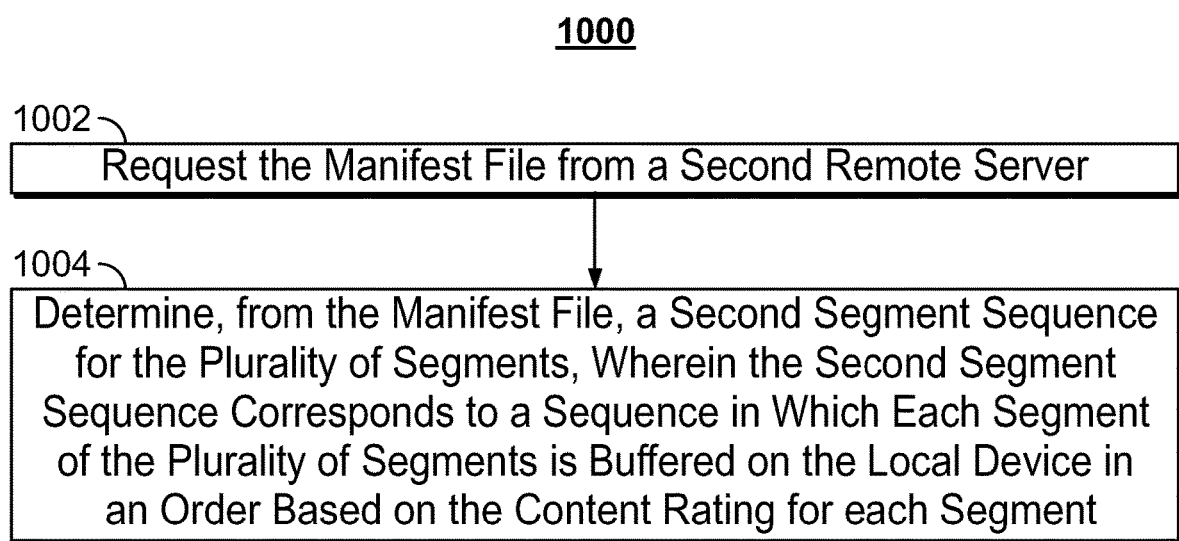
FIG. 10 is a flowchart of a detailed illustrative process for determining, from the manifest file, a second segment sequence for the plurality of segments, in accordance with some embodiments of the disclosure.

FIG. 10 is a flowchart of illustrative steps of a process 1000 for determining, from the manifest file, a second segment sequence for the plurality of segments, in accordance with some embodiments of the disclosure. It should be noted that process 1000 or any step thereof could be performed on, or provided by, any of the devices shown in FIGS. 3-4. For example, process 1000 may be executed by control circuitry 304 (FIG. 3) as instructed by a media guidance application implemented on a user device (e.g., user equipment devices 402, 404, and/or 406 (FIG. 4)) in order to determine, from the manifest file, a second segment sequence for the plurality of segments. In addition, one or more steps of process 1000 may be incorporated into or combined with one or more steps of any other process or embodiment (e.g., as described in relation to FIGS. 5-9 and 11).

At step 1002, the media guidance application requests (via the communication path 420 or 422 (FIG. 4)) the manifest file from a second remote server. It should be noted that multiple servers may possess files associated with the media asset. For example, a second remote server may store segments of the media asset, metadata about the media asset, and the manifest file. The second remote server may therefore be considered the media guidance data source 418 (FIG. 4) or the media content source 416 (FIG. 4).

At step 1004, the media guidance application determines (e.g., via control circuitry 304 (FIG. 3)), from the manifest file, a second segment sequence for the plurality of segments, wherein the second segment sequence corresponds to a sequence in which each segment of the plurality of segments is buffered on the local device in an order based on the threshold bit rate for each segment. For example, the second segment sequence may list the segments in order of rising threshold bit rates. Thus, segments with lower threshold bit rates may be listed before segments with higher threshold bit rates. The second segment sequence may also be organized in the opposite manner.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 10.

Figure 11:
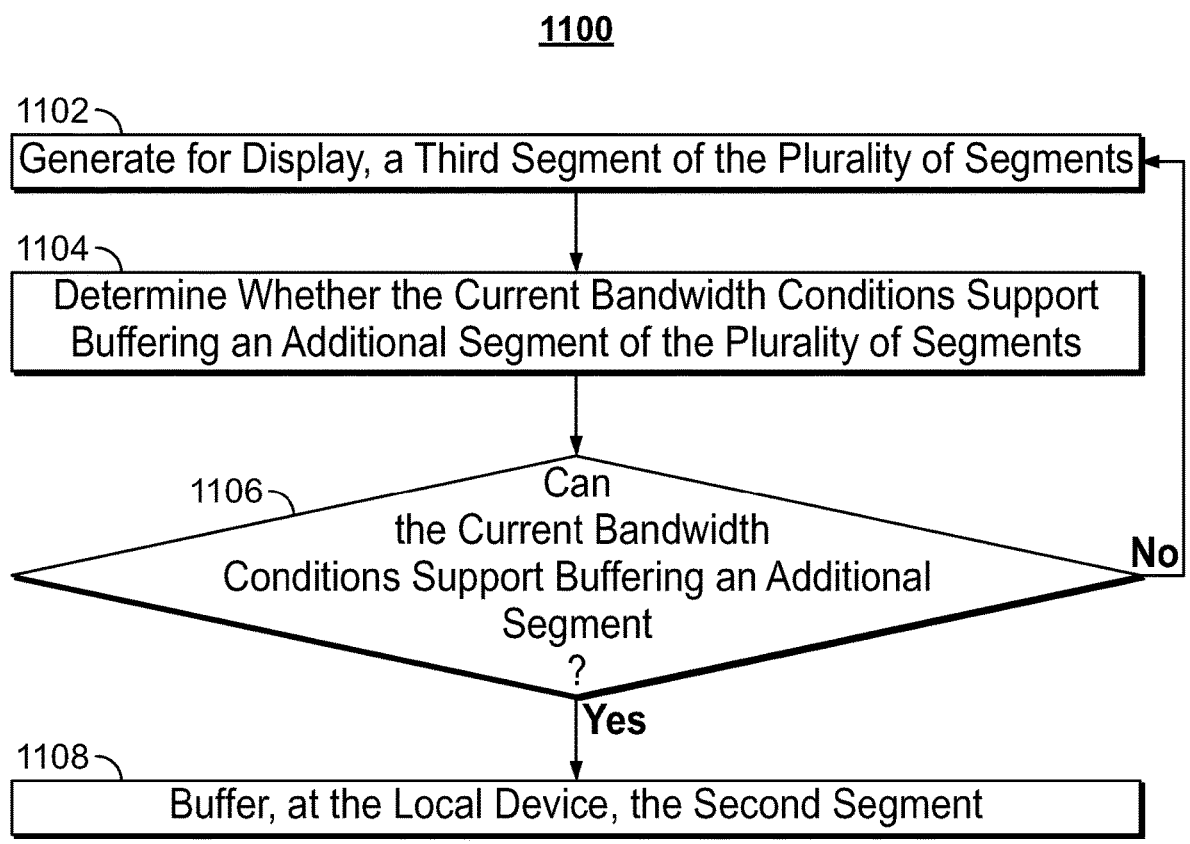
FIG. 11 is a flowchart of a detailed illustrative process for buffering additional segments based on current bandwidth conditions, in accordance with some embodiments of the disclosure.

FIG. 11 is a flowchart of illustrative steps of a process 1100 for buffering additional segments based on current bandwidth conditions, in accordance with some embodiments of the disclosure. It should be noted that process 1100 or any step thereof could be performed on, or provided by, any of the devices shown in FIGS. 3-4. For example, process 1100 may be executed by control circuitry 304 (FIG. 3) as instructed by a media guidance application implemented on a user device (e.g., user equipment devices 402, 404, and/or 406 (FIG. 4)) in order to buffer additional segments based on current bandwidth conditions. In addition, one or more steps of process 1100 may be incorporated into or combined with one or more steps of any other process or embodiment (e.g., as described in relation to FIGS. 5-10).

At step 1102, the media guidance application generates for display (e.g., on display 312 (FIG. 3)), a third segment of the plurality of segments. The third segment may be a part of the media asset that occurs before the first and second segment in terms of playback. For example, the third segment may be the introductory scene of the movie "Mission Impossible."

At step 1104, the media guidance application determines (e.g., via control circuitry 304 (FIG. 3)) whether the current bandwidth conditions support buffering an additional segment of the plurality of segments. The media guidance application may determine the data retrieval rate of the user's local device. The data retrieval rate is the speed at which bits are traveling over the communication path 420 from the media content source 416 (e.g., the remote server) to the user's local device. The data retrieval rate represents the current bandwidth condition. For example, if the data retrieval rate is 5 Mbps and a segment's bit rate is 1 Mbps, the media guidance application may determine that 4 Mbps of the data retrieval rate can be used for other purposes. At step 1106, the media guidance application decides whether the current bandwidth conditions can support buffering an additional segment.

At step 1108, in response to determining that that current bandwidth conditions support buffering an additional segment of the plurality of segments, the media guidance application buffers (e.g., via control circuitry 304 (FIG. 3)), at the local device, the second segment. This is because the media guidance application determines that the data retrieval rate can be utilized to generate the third segment for display and buffer the second segment simultaneously. If the media guidance application determines that the current bandwidth conditions do not support buffering an additional segment of the plurality of segments, the process returns to step 1102 as the media guidance application continues to display the third segment.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 3-4 could be used to perform one or more of the steps in FIG. 11.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for improving quality of service while streaming code-agnostic content, the method comprising:

receiving a user input requesting a media asset;

in response to receiving the user input, identifying a first remote server on which the media asset is stored;

requesting a manifest file of the media asset from a second remote server, wherein the manifest file lists a plurality of segments that constitute the media asset, and wherein the manifest file further indicates a threshold bit rate for each segment;

determining, from the manifest file, a first segment sequence for the plurality of segments, wherein the first segment sequence corresponds to a sequence in which each segment of the plurality of segments is displayed during playback of the media asset on a local device;

determining a first threshold bit rate for a first segment of the plurality of segments and a second threshold bit rate for a second segment of the plurality of segments, wherein the first segment occurs before the second segment in the first segment sequence;

comparing the first threshold bit rate and the second threshold bitrate to determine whether the second threshold bit rate is higher than the first threshold bit rate;

determining to buffer, at the local device, the second segment before the first segment in response to determining that the second threshold bit rate is higher than the first threshold bit rate;

buffering, at the local device, the second segment before the first segment, wherein the buffering occurs while a third segment of the plurality of segments is generated for display from the buffer, and wherein the third segment occurs before both the first segment and the second segment in the first segment sequence; and generating for display, from the buffer, the first segment before the second segment during playback of the media asset on the local device.

2. The method of claim 1, wherein determining to buffer, at the local device, the second segment before the first segment is further in response to determining that current bandwidth conditions support buffering an additional segment of the plurality of segments while the third segment of the plurality of segments is generated for display from the buffer without stalling playback of the third segment.

3. The method of claim 1, further comprising determining, from the manifest file, a second segment sequence for the plurality of segments, wherein the second segment sequence corresponds to a sequence in which each segment of the plurality of segments is buffered on the local device in an order based on the threshold bit rate for each segment.

4. The method of claim 1, wherein the threshold bit rate for each segment is based on a bit rate required to maintain a predetermined minimum video resolution during playback of each respective segment, wherein the predetermined minimum video resolution for each respective segment is determined by a user preference.

5. The method of claim 1, wherein the threshold bit rate for each segment is based on a bit rate required to maintain a predetermined minimum video resolution during playback of each respective segment, wherein the predetermined minimum video resolution for each respective segment is determined by a content provider.

6. The method of claim 1, wherein the threshold bit rate for each segment is based on a bit rate required to maintain a predetermined minimum video resolution during playback of each respective segment, and wherein the predetermined minimum video resolution for each respective segment is determined by detecting a threshold number of different colors in each respective segment.

7. The method of claim 1, wherein the threshold bit rate for each segment is based on a bit rate required to maintain a predetermined minimum video resolution during playback of each respective segment, and wherein the predetermined minimum video resolution for each respective segment is determined by detecting a threshold number of colors changes for a single pixel location on consecutive frames in each respective segment.

8. The method of claim 1, further comprising:
determining a third threshold bit rate for the third segment of the plurality of segments;
comparing the first threshold bit rate and the third threshold bitrate to determine whether the first threshold bit rate is higher than the third threshold bit rate; and
determining to buffer, at the local device, the third segment before the first segment in response to determining that the third threshold bit rate is not higher than the first threshold bit rate.

9. A system for improving quality of service while streaming code-agnostic content, the system comprising:
control circuitry configured to:
receive a user input requesting a media asset;
in response to receiving the user input, identify a first remote server on which the media asset is stored;
request a manifest file of the media asset from a second remote server, wherein the manifest file lists a plurality of segments that constitute the media asset, and wherein the manifest file further indicates a threshold bit rate for each segment;
determine, from the manifest file, a first segment sequence for the plurality of segments, wherein the first segment sequence corresponds to a sequence in which each segment of the plurality of segments is displayed during playback of the media asset on a local device;
determine a first threshold bit rate for a first segment of the plurality of segments and a second threshold bit rate for a second segment of the plurality of segments, wherein the first segment occurs before the second segment in the first segment sequence;
compare the first threshold bit rate and the second threshold bitrate to determine whether the second threshold bit rate is higher than the first threshold bit rate;
determine to buffer, at the local device, the second segment before the first segment in response to determining that the second threshold bit rate is higher than the first threshold bit rate;
buffer, at the local device, the second segment before the first segment, wherein the buffering occurs while a third segment of the plurality of segments is generated for display from the buffer, and wherein the third segment occurs before both the first segment and the second segment in the first segment sequence; and
generate for display, from the buffer, the first segment before the second segment during playback of the media asset on the local device.

10. The system of claim 9, wherein control circuitry is further configured to determine to buffer, at the local device, the second segment before the first segment is further in response to determining that current bandwidth conditions support buffering an additional segment of the plurality of segments while the third segment of the plurality of segments is generated for display from the buffer without stalling playback of the third segment.

11. The system of claim 9, wherein control circuitry is further configured to determine, from the manifest file, a second segment sequence for the plurality of segments, wherein the second segment sequence corresponds to a sequence in which each segment of the plurality of segments is buffered on the local device in an order based on the threshold bit rate for each segment.

12. The system of claim 9, wherein the threshold bit rate for each segment is based on a bit rate required to maintain a predetermined minimum video resolution during playback of each respective segment, wherein the predetermined minimum video resolution for each respective segment is determined by a user preference.

13. The system of claim 9, wherein the threshold bit rate for each segment is based on a bit rate required to maintain a predetermined minimum video resolution during playback of each respective segment, wherein the predetermined minimum video resolution for each respective segment is determined by a content provider.

14. The system of claim 9, wherein the threshold bit rate for each segment is based on a bit rate required to maintain a predetermined minimum video resolution during playback of each respective segment, and wherein the predetermined minimum video resolution for each respective segment is determined by detecting a threshold number of different colors in each respective segment.

15. The system of claim 9, wherein the threshold bit rate for each segment is based on a bit rate required to maintain a predetermined minimum video resolution during playback of each respective segment, and wherein the predetermined minimum video resolution for each respective segment is determined by detecting a threshold number of colors changes for a single pixel location on consecutive frames in each respective segment.

16. The system of claim 9, wherein control circuitry is further configured to:
   determine a third threshold bit rate for the third segment of the plurality of segments;
   compare the first threshold bit rate and the third threshold bitrate to determine whether the first threshold bit rate is higher than the third threshold bit rate; and
   determine to buffer, at the local device, the third segment before the first segment in response to determining that the third threshold bit rate is not higher than the first threshold bit rate.

* * * * *